United States Patent
Chen et al.

(10) Patent No.: US 9,075,825 B2
(45) Date of Patent: Jul. 7, 2015

(54) SYSTEM AND METHODS OF INTEGRATING VISUAL FEATURES WITH TEXTUAL FEATURES FOR IMAGE SEARCHING

(71) Applicants: Xue-wen Chen, Lawrence, KS (US); Bo Luo, Lawrence, KS (US)

(72) Inventors: Xue-wen Chen, Lawrence, KS (US); Bo Luo, Lawrence, KS (US)

(73) Assignee: The University of Kansas, Lawrence, KS (US)

( * ) Notice: Subject to any disclaimer, the term of this patent is extended or adjusted under 35 U.S.C. 154(b) by 125 days.

(21) Appl. No.: 13/627,716

(22) Filed: Sep. 26, 2012

(65) Prior Publication Data

US 2013/0080426 A1 Mar. 28, 2013

Related U.S. Application Data

(60) Provisional application No. 61/539,186, filed on Sep. 26, 2011.

(51) Int. Cl.
G06F 7/02 (2006.01)
G06F 17/30 (2006.01)

(52) U.S. Cl.
CPC .... G06F 17/30247 (2013.01); G06F 17/30539 (2013.01); G06F 17/30268 (2013.01); G06F 17/30265 (2013.01)

(58) Field of Classification Search
CPC .............. G06F 17/30796; G06F 17/30799
USPC ........................................ 707/723
See application file for complete search history.

(56) References Cited

U.S. PATENT DOCUMENTS

| 6,941,321 | B2 * | 9/2005 | Schuetze et al. ........................ 1/1 |
| 7,627,556 | B2 * | 12/2009 | Liu et al. ................................ 1/1 |
| 2002/0168117 | A1 | 11/2002 | Lee et al. |
| 2005/0246105 | A1 * | 11/2005 | Faber et al. ..................... 702/19 |
| 2009/0313239 | A1 | 12/2009 | Wen et al. |
| 2010/0158412 | A1 | 6/2010 | Wang et al. |
| 2010/0223258 | A1 * | 9/2010 | Ghahramani et al. ........ 707/723 |
| 2011/0047163 | A1 * | 2/2011 | Chechik et al. ............... 707/741 |
| 2012/0054177 | A1 | 3/2012 | Wang et al. |
| 2012/0121193 | A1 | 5/2012 | Lipson et al. |
| 2012/0158784 | A1 | 6/2012 | Bluvband et al. |
| 2012/0177297 | A1 | 7/2012 | Everingham |

(Continued)

FOREIGN PATENT DOCUMENTS

| CN | 1851713 A | 10/2006 |
| WO | 2005008519 A1 | 1/2005 |

(Continued)

OTHER PUBLICATIONS

Natsev, Semantic Concept-Based Query Expansion and Re-ranking for Multimedia Retrieval, Sep. 2007, ACM.*

(Continued)

*Primary Examiner* — Bruce Moser
(74) *Attorney, Agent, or Firm* — Valauskas Corder LLC

(57) ABSTRACT

The present invention includes a system and methods for image searching. Embodiments of the system integrate textual features and visual features for improved search performance. The system represents text terms in the visual feature space and develops a text-guided weighting scheme for visual features. The weighting scheme infers intention from query terms and enhances the visual features that are significant in light of such intention.

20 Claims, 33 Drawing Sheets
(28 of 33 Drawing Sheet(s) Filed in Color)

(56) References Cited

U.S. PATENT DOCUMENTS

| | | | |
|---|---|---|---|
| 2012/0183206 | A1 | 7/2012 | Tan et al. |
| 2013/0006972 | A1 | 1/2013 | Ramos et al. |
| 2013/0041885 | A1 | 2/2013 | Bennett |
| 2013/0054561 | A1 | 2/2013 | Bennett |

FOREIGN PATENT DOCUMENTS

| | | | |
|---|---|---|---|
| WO | 2008003095 | A2 | 1/2008 |
| WO | 2013075316 | A1 | 5/2013 |

OTHER PUBLICATIONS

Internet web site http://en.wikipedia.org—Webpage describing computer vision techniques Link: http://en.wikipedia.org/wiki/Computer_vision.

Internet web site http://ieeexplore.ieee.org—Abstract of IEEE presentation on utilizing both image and text information in a search (2005) Link: http://ieeexplore.ieee.org/xpl/login.jsp?tp=&arnumber=1544937&url=http%3A%2F%2Fieeexplore.ieee.org%2Fxpls%2Fabs_all.jsp%3Farnumber%3D1544937.

Internet web site http://ieeexplore.ieee.org—Abstract of IEEE presentation on learning the semantics of words and pictures (2001) Link: http://ieeexplore.ieee.org/xpl/login.jsp?tp=&arnumber=937654&url=http%3A%2F%2Fieeexplore.ieee.org%2Fxpls%2Fabs_all.jsp%3Farnumber%3D937654.

Internet web site http://ieeexplore.ieee.org—Abstract of IEEE presentation on query by image and video content (1995) Link: http://ieeexplore.ieee.org/xpl/login.jsp?tp=&arnumber=410146&url=http%3A%2F%2Fieeexplore.ieee.org%2Fxple/o2Fabs_all.jsp%3Farnumber%3D410146.

\* cited by examiner

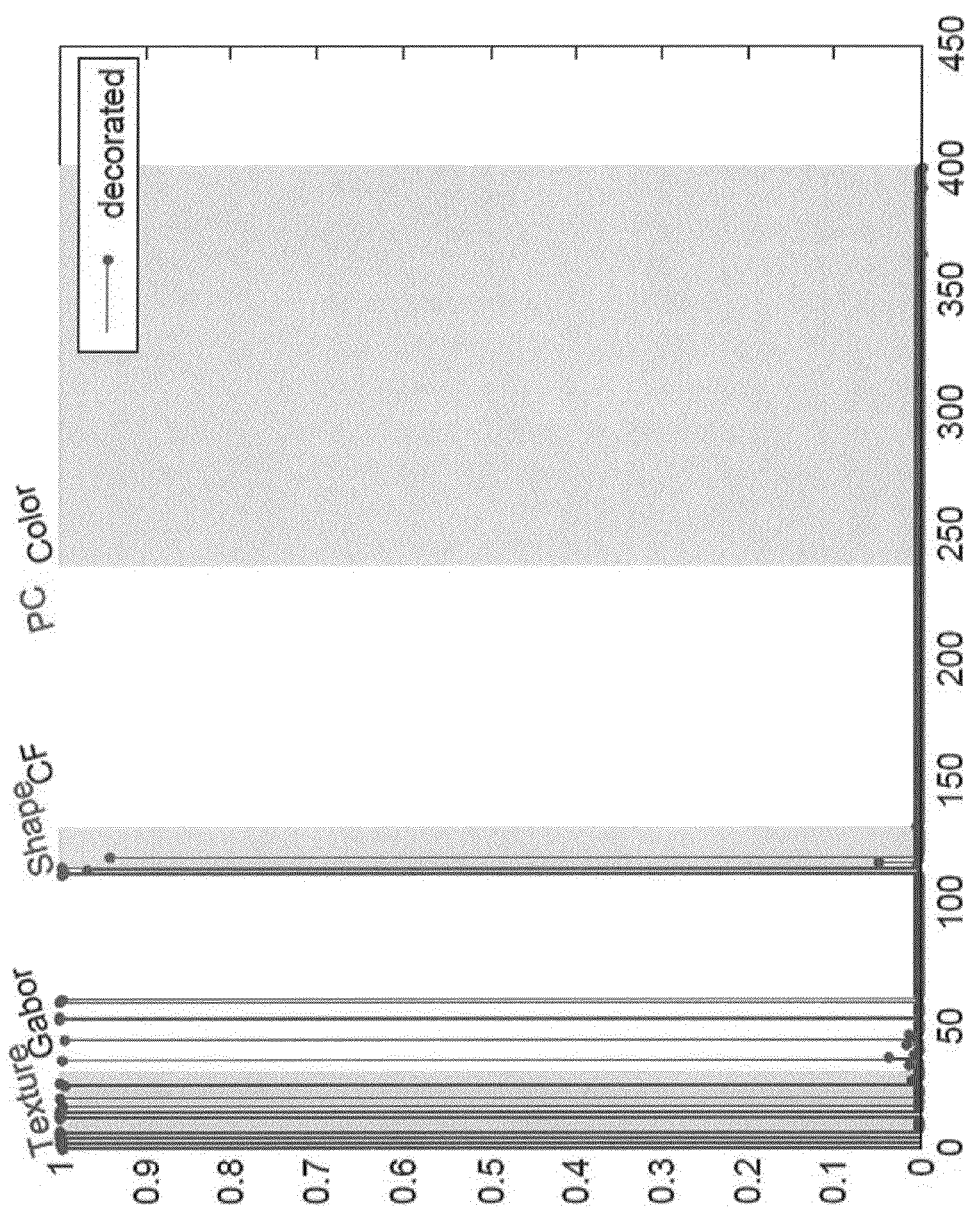

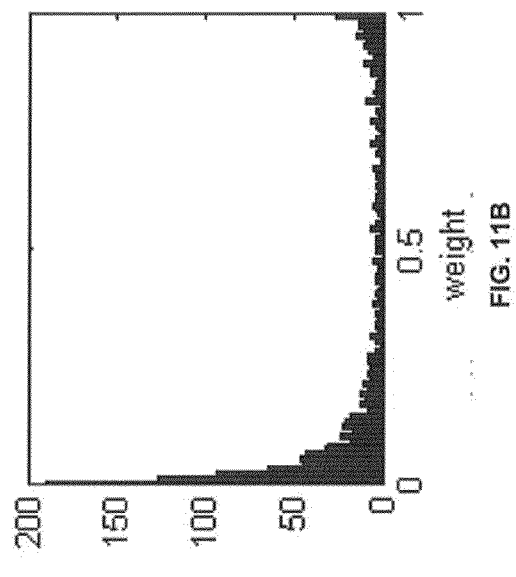
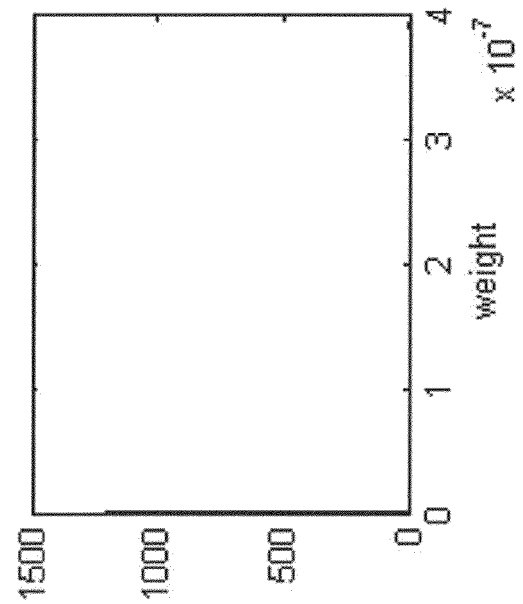
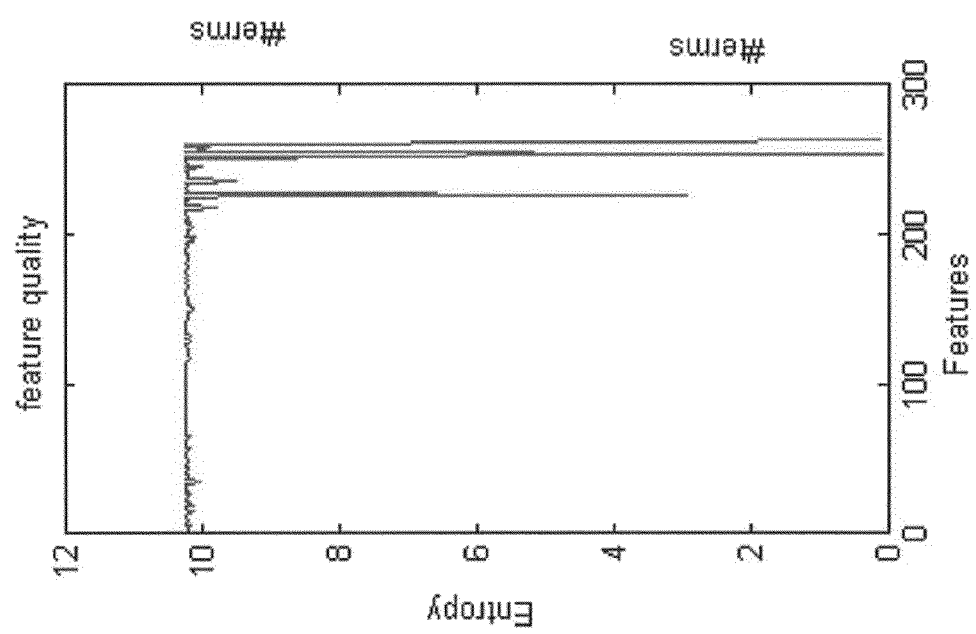
FIG. 11A
FIG. 11B
FIG. 11C

SYSTEM AND METHODS OF INTEGRATING VISUAL FEATURES WITH TEXTUAL FEATURES FOR IMAGE SEARCHING

CROSS REFERENCE TO RELATED APPLICATIONS

This application claims the benefit of U.S. Provisional Application No. 61/539,186 filed Sep. 26, 2011.

STATEMENT CONCERNING FEDERALLY SPONSORED RESEARCH

This invention was made with U.S. government support under Contract No. 0644366 awarded by the National Science Foundation. The U.S. government has certain rights in the invention.

FIELD OF THE INVENTION

The invention relates generally to a system and methods of searching for images. More particularly, the present invention relates to a system and methods for integrating visual features with textual features for image searching.

BACKGROUND OF THE INVENTION

Networks such as the Internet or an intranet often facilitate access to a large quantity of information. Similarly, databases often store large quantities of information. When using networks or databases, users often wish to find certain information. Accordingly, many networks or databases are searchable by using a search function. A search function typically permits the user to enter a search query to permit finding certain information. For purposes of this application, the term "search query" or "query" is any input provided by the user to a search function for purposes of obtaining search results. Although a query may be entered in a non-text format, for example, by selecting among presented options, many search functions permit entry of a query in text format.

If a user wishes to find a specific section of text within a network or database, the search function looks for matches between the query text and the text accessible in the network or database. However, when searching for non-text information, the search function cannot merely match the query text to the non-text information. The non-text information may include images, videos, flashes, or other multimedia information. All types of non-text information will be generally termed an "image" for purposes of this application.

Various known search function systems and methods permit using a text query to find certain types of images.

In early search functions, in order to associate text with an image, someone had to manually create text descriptions of images and associate such descriptions with each image. After such descriptions were made, the search function could assess whether there were any matches between the descriptions and the query text. Clearly, reviewing and describing each image is a time intensive and inefficient process to implement for networks and databases having large quantities of information.

To overcome the time intensive step of manually describing images, search functions were configured to incorporate into the search certain text that was already associated with the image. For example, text already associated with the image may include a caption, file name, link to a website, text from surrounding web page, text from surrounding document in a database, user-generated label, tagging of information, or any other type of metadata. However, text associated with an image may include only an incomplete description or no description at all. For example, a file named "image1.pdf" reveals little about the contents of the image.

Another search technique was developed to permit searching images for certain non-text parameters. Such technique is often termed "content-based image retrieval" (CBIR). CBIR includes using a machine to identify the contents of the images. For example, the contents of the images may be detected using computer vision techniques, which permit a computer system to automatically assess and detect the presence of low-level visual features, such as colors, shapes, and texture, of an image. However, CBIR is generally limited to detecting low-level visual features and cannot detect high-level image content. High-level image content may include the sum of the low-level image contents, for example, many shapes and colors together form an image of an animal or a person. In other words, a person may view a picture and identify a specific celebrity, while the computer system may identify only colors, shapes, and textures. The difference between identifying low-level image contents and high-level image contents is termed a "semantic gap".

A system has been developed using parts of CBIR to permit more efficient creation of text descriptions or annotations for images, for example, automated image tagging or folksonomic image tagging. Automated image tagging has been developed using classification and supervised learning techniques. In such methods, a classifier may train using a test set of annotated images. During training, the classifier learns which annotations are associated with which low-level visual features (e.g., color, shapes, texture). Then, by ascertaining the low-level visual features, the classifier can assign an annotation to other images. A simplified example is, if certain images having lines radiating from a circle are annotated with the note "sun", when the classifier detects lines radiating in a circle in an un-annotated image, it will supply the term "sun" as an annotation.

Folksonomic tagging of an image is the tagging that occurs by many people on a network. For example, many people tag photos in the Facebook network. Folksonomic tagging can be used for classifier learning in automated tagging. However, both automated tagging and folksonomic tagging techniques are limited by the low-level features that the system is capable of assessing.

Certain types of CBIR permit a user to enter a non-text based query to eliminate the text to visual feature transition. For example, a user may prepare a sketch of that which the user wishes to find in an image. In such techniques, CBIR compares the image content of the sketch to the image content in the images available through the networks or databases. However, many users may have difficulty creating an image having close approximation to that which they wish to find. Alternatively, certain software may permit creation of improved quality images. However, such software is typically complex and expensive.

Another limitation of CBIR is that it typically requires considerable computer resources for tasks such as indexing of images and other computational tasks, which make CBIR impractical for large databases.

Furthermore, there have been prototypes of CBIR searches for the entire World Wide Web, also termed "Web". However, conventional visual content based image search functions suffer from two major disadvantages inherited from CBIR—semantic gap problems and computation overload. To tackle such problems, alternative approaches have been proposed. In the Web search scenario, both images and text contents are available, which provide opportunities to bridge the semantic gap and provide better indexing by integrating features from both of the images and text contents.

A two-step hybrid approach has been developed. The hybrid approach first uses a text-based search to generate an intermediate answer set with high recall and low precision, and then apply CBIR methods to cluster or re-rank the results. The visual and textual features are used separately and are not semantically associated. However, the conventional hybrid approach suffers from oversimplified image features and clustering methods. Complicated re-ranking algorithms have also been proposed for better search performance and user experience. Most recently, certain image searches have started to employ CBIR methods to re-rank search results when users click on a "show similar images" function. Also, other types of text-image interaction use visual information to help describe images.

To address the large computational requirements required for the entire Web, certain known methods apply CBIR to a vertical search. A vertical search engine or a niche search engine is a domain-specific search engine that works on a smaller sub-graph or sub-domains of the Web. Examples of vertical search include scientific publications search (e.g. Google Scholar, CiteSeer), product search (e.g. Google Product, Yahoo! Shopping), Blog search, source code search, local search, etc. Vertical search engines have shown better performance than general Web search engines (e.g. precision, ranking), because they are more focused and optimized with domain knowledge.

A vertical search engine uses focused crawlers to crawl constrained subsets of the general Internet and evaluate user queries against such domain-specific collections of documents. In addition to the benefits of working on much smaller datasets, they are also able to incorporate domain knowledge to help with relevance assessment and results ranking. There are also off-line image retrieval systems that work on domain-specific collections of images, such as personal album search, leaf images search, fine arts image search, etc. These conventional approaches utilize domain knowledge in image pre-processing, feature selection, and similarity assessment. For instance, leaf image retrieval puts emphasis on shape and texture features, while personal album search usually employs face recognition methods.

Clearly, image searching on the Web has many challenges, for example, resolving the semantic gap between low-level visual features and high-level content and the excessive computation brought by huge amount of images and high dimensional features. Therefore, there is a need for a system and methods to improve image searching that permits integration of text features and visual features. The present invention satisfies this demand.

SUMMARY OF THE INVENTION

The system and methods of the present invention permit an improved image search.

In certain embodiments, textual features from Web pages (or other text surrounding an image) are integrated with visual features from image content to conduct an image search. By searching with the integrated text and visual features, more relevant images are found compared to a text-based search alone, a visual-based search alone, or a multi-step text-then-visual search.

In certain embodiments, the meaning of each text term may be captured in a visual feature space and visual features may be reweighed according to significance to the query content. Such embodiments bridge the semantic gap between visual features and abstract concepts to improve image searching on the Web.

Certain embodiments of the present invention are configured to provide improved search results by estimating the user's cognitive intention, for example, by analyzing the text query input into the system and ranking the results according to user intention.

Certain embodiments of the present invention are configured to operate in a vertical search environment. Such environments have a number of advantages. For example, the text context has an improved organizational structure. Accordingly, focused or customized crawlers/parsers are able to generate data patterns and structured data, instead of free text. In addition, working in a vertical search environment permits associating text content with images with high confidence, meaning that text is likely to be relevant to the image. The focused crawlers in a vertical search are able to connect text contents with a corresponding image or images, e.g. product images and product descriptions, paintings and introductions, etc. With the knowledge of the focused domain, the system and methods of the present invention are able to select image features and similarity measures that are more effective for the domain. Finally, computation issues become less critical for a smaller data set.

For purposes of this application, the present invention is discussed in reference to image searching in a product search (specifically, apparel products), but the discussion is merely exemplary. The present invention is applicable to any type of vertical search. Also, embodiments of the present invention are discussed in reference to searching the Web, but this discussion is also exemplary. The present invention is applicable to searching any network, database, or other information source that includes images.

Embodiments of the present invention utilize both textual features (from product description) and visual features (from product images) for items. Certain embodiments are configured to mimic a human's perception of "similarity", and return results that are similar to the user's input.

The user's intention, which is implicitly carried with search terms, is predicted. For example, the query "blue shirt" indicates that the intention is more concerned with color than any other aspect of the query. However, such clearly expressible intention is not available for all the terms, and such perception is yet to be mapped to low-level feature spaces. The system and methods of the invention may include assessment of the perception and intention behind each keyword in the visual feature space, and use the perception and intention for searching as well as re-weighting visual features according to their significance to the query. The system and methods may integrate textual and visual features in accordance with a perception, and develop a similarity measure and ranking method that better fits an intention.

The system and methods demonstrate that truly integrating textual and visual features improves ranking in a vertical search, especially in the domains where visual contents are equally significant to text contents. The system and methods also improve overall recall by yielding items that would otherwise be missed by searching with either type of the features. The system and methods include creating an inference of a visual intention behind search terms, and include applying such intention to improve relevance assessment and ranking through a textual-feature-guided visual feature selection and weighting methodology. The system and methods may also assess representations of keywords in the visual feature space, and compute the semantic relationships of the terms.

Thus, the system and methods are able to automatically generate a thesaurus based on the visual semantics of words.

Certain embodiments of the present invention are configured to operate in a domain where text content is directly associated with image content. Online shopping, especially clothing shopping, is one example of such domains. In shopping websites, text descriptions are always available with item images, and are usually accurate descriptions of the image contents. Moreover, both text descriptions and product images are important since from a user perspective, the users can only issue keyword queries inputted into the system for product search. However, while browsing the results, users focus more on visual presentations than the text specifications. Second, due to different personal tastes of users, the descriptions of fashionable items are very subjective. Hence, traditional text-based search on such descriptions may not yield satisfactory results. In particular, the recall can be very low when there is a discrepancy between a user's and a narrator's tastes or vocabularies. Third, in many cases two items may have similar style in perception, but one sees a huge difference in the visual features. Accordingly, pure content-based image search will not yield high recall either.

An embodiment of a system of the present invention includes a crawler component, a pre-processor component, and a search and user interface component.

A crawler component fetches web pages from websites such as retailer website, where structured text descriptions and item images are both available.

A pre-processor component may include a text parser or a customized parser to pre-process Web pages. Such processing may include fitting item information (e.g. title, description) into a predefined universal schema. Using classic text retrieval methods, the text processor generates a term dictionary and a text index. Another pre-preprocessor component, for example, an image processor may simultaneously segment product images and calculate low level visual features. The system integrates textual features and visual features by calculating a "centroid" vector and a weight vector in the visual feature space for each text term. Such vectors are further utilized in item ranking.

The search and user interface may provide a query interface as well as display browsing views of search results.

Embodiments of a method according to the present invention are configured to permit improved image searching. First, the information set that will be analyzed for a search query is collected or accessed. Then, the images in the information set is analyzed for visual features. The images may be segmented to remove portions of the image that are not relevant to the search (e.g., background materials). The visual features are normalized to permit comparison. Then, the system works to discover visual meaning of text terms, for example, a keyword. Once the system learns how to discover visual meaning of text terms automatically, the visual features are weighted relative to the keyword. Specifically, the system determines which visual features are associated with certain keywords, and then, gives such visual features higher weight when that keyword is used as a text query.

In addition, a visual thesaurus of keywords is created based on similarities between keywords. For example, a keyword is likely to be a synonym with another keyword if the visual features associated with the keywords include many overlapping visual features.

Another step in a method embodiment may include a weight vector optimization step. In such a step, the system compensates for false negative results and false negatives and correlates a weight vector with each keyword. When a keyword is entered in a text query, the weight vector (or combined weight vector if multiple keywords are entered in a query) is used to calculate search results.

An objective of the present invention is to integrate text features with virtual features to improve image search results.

Another objective of embodiments the present invention is to infer user intention from a text query to provide the image results that a user is most likely to find most relevant.

Another objective of embodiments the present invention is to infer user intention from a text query to provide the image results that a user is most likely to find most relevant.

Another objective of embodiments the present invention is to rank search results to emphasize visual features that the user is most likely to find relevant.

Another objective of embodiments the present invention is to weight the results based on visual features.

Another objective of embodiments the present invention is to expand the results beyond the visual query results to include text query results.

Another objective of embodiments the present invention is to expand the results beyond the text query results to include visual query results.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The preferred embodiments of the invention will be described in conjunction with the appended drawings provided to illustrate and not to limit the invention, where like designations denote like elements, and in which:

FIG. 4E shows a weight vector for the keyword "orange" according to an embodiment of the invention;

FIG. 11A illustrates an exemplary feature-quality curve;

FIGS. 11B and 11C show weight histograms for two different features according to one embodiment of the invention;

DETAILED DESCRIPTION OF EMBODIMENTS OF THE INVENTION

Figure 1A:
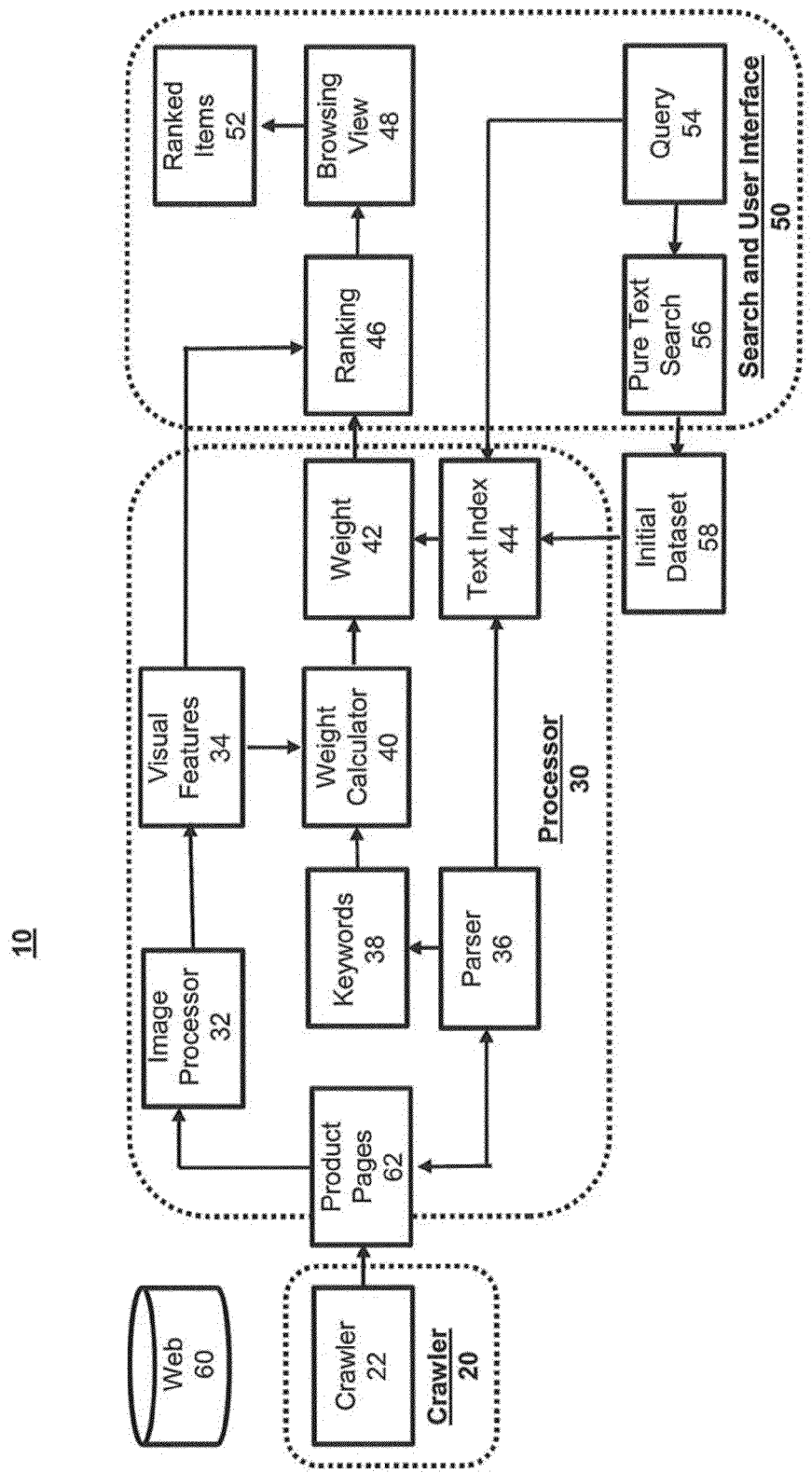
FIG. 1A illustrates a system for image searching according to certain embodiments of the invention.
Figure 1B:
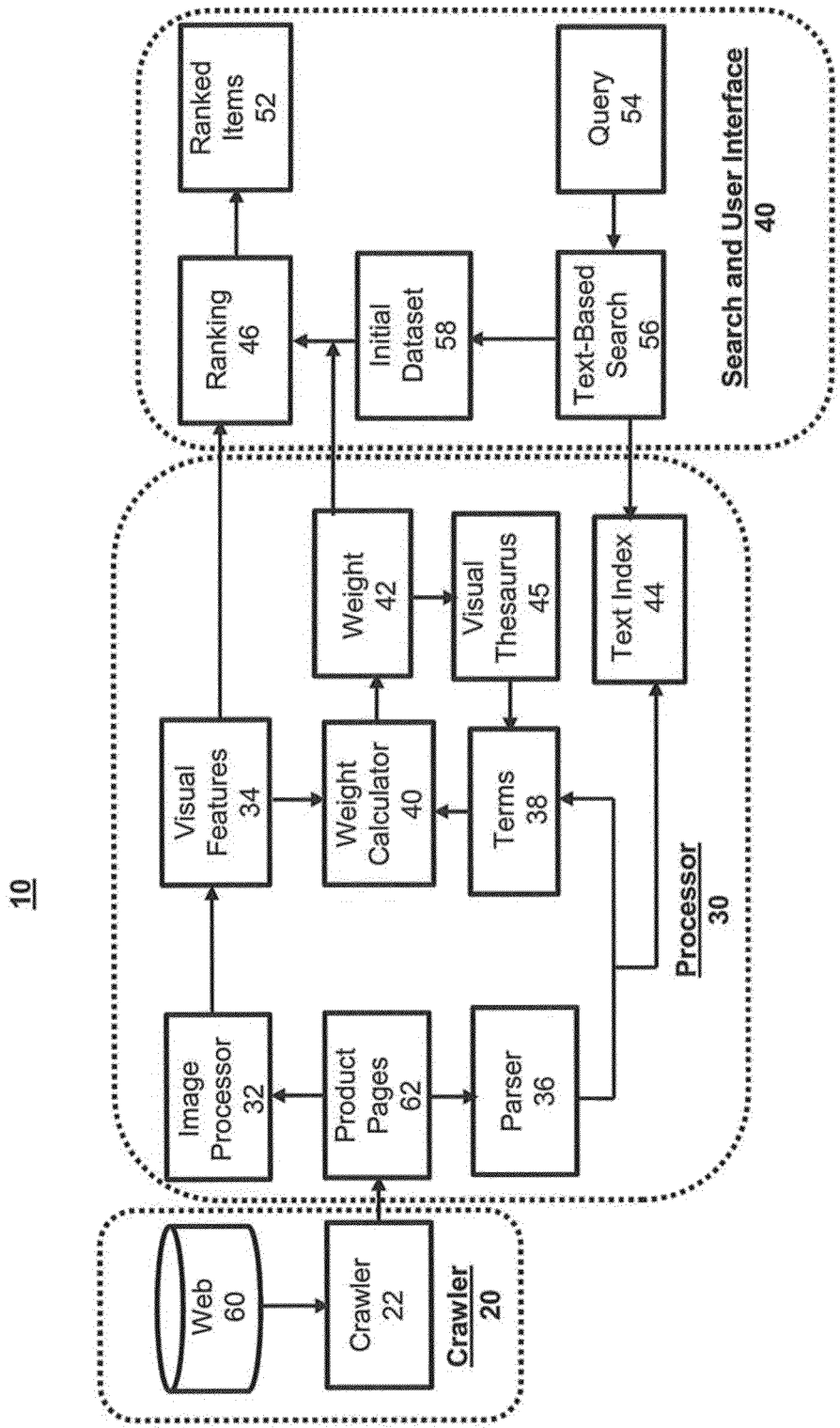
FIG. 1B illustrates a system for image searching according to certain embodiments of the invention.

Embodiments of the present invention include a system and methods are configured to permit an improved image search. Certain embodiments include a crawler component 20, a processor 30, and a search and user interface 40.

A crawler component 20 is a component configured to fetch webpages 62 from websites. In certain embodiments, the crawler 20 will be configured to fetch only certain types of web pages, for example, webpages that include images, webpages that advertise apparel, or permit shopping for apparel.

A processor 30 includes an image processor 32 and a parser 36. An image processor 32 and a parser 36 may be configured to function simultaneously. The image processor 32 extracts visual features from the images. The parser 36 extracts descriptions associated with the image from the web page, and then generates a term dictionary and inverted index. The text features extracted by the parser 36 and the visual features extracted by the image processor 32 are then integrated using a reweighting scheme. A visual thesaurus is constructed for each text term. The image items 52 are ranked.

A user interface 40 is configured to display the ranked items 52. The user interface 40 also may be configured to display a query input option, for example, a field in which the user may view and enter the query.

Embodiments of the present invention also include method steps configured to improve image searching. A user enters a text query, which provides a ranked list of relevant items, namely the initial result set. For each result in the initial result set, the system constructs a new query by integrating textual and visual features from item images. Each expanded query is evaluated to find more similar items. In addition, a weight vector which represents the "visual perception" behind the text query is enforced during evaluation of the expanded queries. For example, with a query "silky blouse", the weight factor will increase the significance of some texture features, and fade out irrelevant features, and interpret the visual meaning behind search term "silky". The system infers intentions from a text query and enhances the corresponding visual features that are implicitly favored in the intentions (e.g. query term "yellow" implicitly favors color features).

In one exemplary embodiment, the system initially crawled a total of 20,788 product items from six online retailers. In another embodiment, the system crawled 42,292 items from eight online retailers. The retailers all provide mid-sized high-quality images and well-structured textual descriptions. The system used focused crawlers to harvest both text and images. As is known in the art, the system may be easily expandable by implementing more customized crawlers 20 and parsers 36.

For each product, the system recorded the name, category, class, online product ID, local path of the main image, original uniform resource locator ("URL"), detailed textual description, color tags, and size information, if available. The system applied a unique identification ("id") for each product item, to identify both the database record and the image file. Text information was stored in a database.

In order to make a sufficient coverage of an image's semantic meaning, the system attempts to diversify a part of feature selection. In one embodiment, a set of 263 commonly used texture, shape, intensity and color features of images are extracted by the system to represent the low-level visual features of those images.

The system may include a gray level co-occurrence matrix to capture the basic texture information. Contrast, correlation, energy, and homogeneity of the gray scale images are calculated, each of which generates a 4-scale feature vector. Image coarseness and direction are obtained by calculating 3 dimensions of texture features. To extract the shape information, the system represents the contour of an image in terms of seven geometric invariant moments, which are invariant under rotation, scale, translation and reflection of images. To capture texture patterns in frequency domain, the system applies Gabor wavelet filters in eight directions and five scales, acquiring a vector of forty texture features. Fourier descriptors may also be employed by the system, contributing a 9-dimensional feature vector to the feature set. As part of shape features, the edge orientation is represented by phase congruency features ("PC") and moments of characteristic function ("CF").

The system has a three-level Daubechies wavelet decomposition of the test image carried out. At each level, the first four moments of phases, which are generated by a Sobel edge detector, are obtained, together with the first three moments of the characteristic function, yielding a 28-dimensional feature vector. The system may demonstrate the image intensity using 48 statistics of 4 by 4 block histograms, with 16 dimensions in each of the red ("R"), green ("G"), and blue ("B") components. The color features may be generated by a color quantization approach. The system may map the original image into the hue, saturation, and value ("HSV") color space, and implement color quantization using 72 colors (8 levels for hue ("H") channel, 3 levels for saturation ("S") channel, and 3 levels for value ("V") channel).

In the system of the present invention features may be automatically weighted based on their significance to the intent, which is implicitly carried by the query. Less important features can be faded out, while more important features are enhanced. Therefore, unlike other conventional CBIR approaches, one advantage of the present invention is that the "quality" of low-level visual features is not the key factor for retrieving images in the system of the invention. Moreover, the system and methods of the invention are robust and have a ranking quality that is less sensitive to the selection of low-level image features.

A database of the system may contain images of products in all shapes and sizes. Various retailers have different specifications of their product demos, some of which have introduced non-ignorable errors to feature extraction. For instance, the presence of a lingerie model in a product demo could significantly influence the feature distribution. To simplify and clean up the representation of product images and minimize the error of features, the system may perform an "YCbCr Skin-color Model"-based image segmentation to remove the background such as skin area to highlight product items.

The system of the invention may use diverse types of image features. However, features from different categories are not comparable with each other, since they take values from different domains. Without any normalization, search results will be dominated by those features taking larger values. To reduce the interferences brought by different feature types and scopes, the range of each feature $\vec{x}$ to $(0,1)$ is mapped:

$$y_i = \frac{x_i - \min(\vec{x})}{\max(\vec{x}) - \min(\vec{x})}$$

in which i indicates the i-th item.

After normalizing, all the features are mapped into $\vec{y}$ with the same scale, and become comparable.

The vast source of Web data being distributed in a metadata space, to a certain extent, indicates that the role of semantic subspaces and visual subspaces are complementary. Textual information can better represent the semantic meaning while visual knowledge plays a dominant role at the physical level. The system and methods of the invention use a native approach to bridge the semantic gap, which allows easy transformation from one subspace to another.

To some extent, textual description is a projection of perception. Unlike visual features, where there's always a semantic gap, text directly represents a perception. However, there are difficulties using only text features. First, perception is a subjective matter. Second, the same impression could be described through different words. Third, calculating text similarity (or distance) is difficult—distance measurements (such as cosine distance in a term frequency-inverse document frequency ("TF/IDF") space do not perfectly represent the distances in perception. For instance, from a customer's perspective, a 'relaxed-cut' may be similar to a 'regular-cut' and quite different from a 'slim-cut'. However, they are equally different in terms of textual representation (e.g. in a vector space model). Similarly, "pale" is similar to "white", but different than "grey".

To make up for the deficiency of a pure text search, the system attempts to map keywords into a visual subspace. Since the text description represents the narrator's perception of the visual features, the system assumes items that share the same keyword or keywords may also share some consistency in selected visual features.

Moreover, if the consistency is observed over a significant number of items described by the same keyword, the system may have such a set of features and their values represent the "visual" perception of the keyword.

Figure 2A:
FIG. 2A illustrates images that have the keyword "floral" in their descriptions.
Figure 2B:
FIG. 2B illustrates images that have the keyword "dotted" in their descriptions.

For instance, consider the items with the keyword "floral" or "dotted (some examples are shown in FIG. 2A and FIG. 2B, respectively). Although the items come from different categories and different retailers, they all share very unique texture features. However, the items all differ in many other features, such as color and shape. This indicates that the term "floral" is particularly used to describe certain texture features. When a query text search is inputted into the system with this term, the intention is to find such texture features. The intention is not about finding a particular color or shape. In this way, many terms could be connected with such a "visual meaning". The system and methods of the invention discover such "visual meanings" automatically.

Suppose there are N items sharing the same keyword, and each item is represented by an M-dimensional visual feature vector: $\vec{X}_k = (x_{k_1}, x_{k_2}, \ldots, c_{k_M})^T$, where $k \in [1,N]$. The mean vector of the N feature vectors could be utilized as a base representation of the keyword in the visual feature space:

$$\vec{\mu} = \left( \frac{1}{N} \sum_{k=1}^{N} x_{k_1}, \frac{1}{N} \sum_{k=1}^{N} x_{k_2}, \ldots, \frac{1}{N} \sum_{k=1}^{N} x_{k_M} \right)^T$$

In the above equation, if N is large enough $\vec{\mu}$ will preserve the common dimensions of the feature matrix and smooth over the various sections. In such a manner, the mean vector is rendered as a good representation of the keyword. However, those N feature vectors will only share consistency over selected features, hence, not all dimensions of the mean vector makes sense. As shown in the "floral" example, those items are only similar in some texture features, while they differ a lot in terms of color and shape features. Such consistency/inconsistency of the feature is a better indicator of the significance of the feature towards perception of the keyword. Therefore, a task that may be performed by the system and methods of the invention is to quantify such consistency or inconsistency.

As shown in the "floral" example, features that are coherent with the perception of the keyword tend to have consistent values, while other features are more likely to be diverse.

For example, suppose that there are two groups of samples: A positive: $N_1$ items that have the keyword in their descriptions, and B negative: $N_2$ items that do not contain the keyword. In this way, if the meaning of a keyword is coherent with a visual feature, its $N_1$ values in the positive group should demonstrate a different distribution than the $N_2$ values in the negative group. Moreover, the feature values in the positive group often have a small variance, while feature values in the negative group are diversified.

Figure 3A:
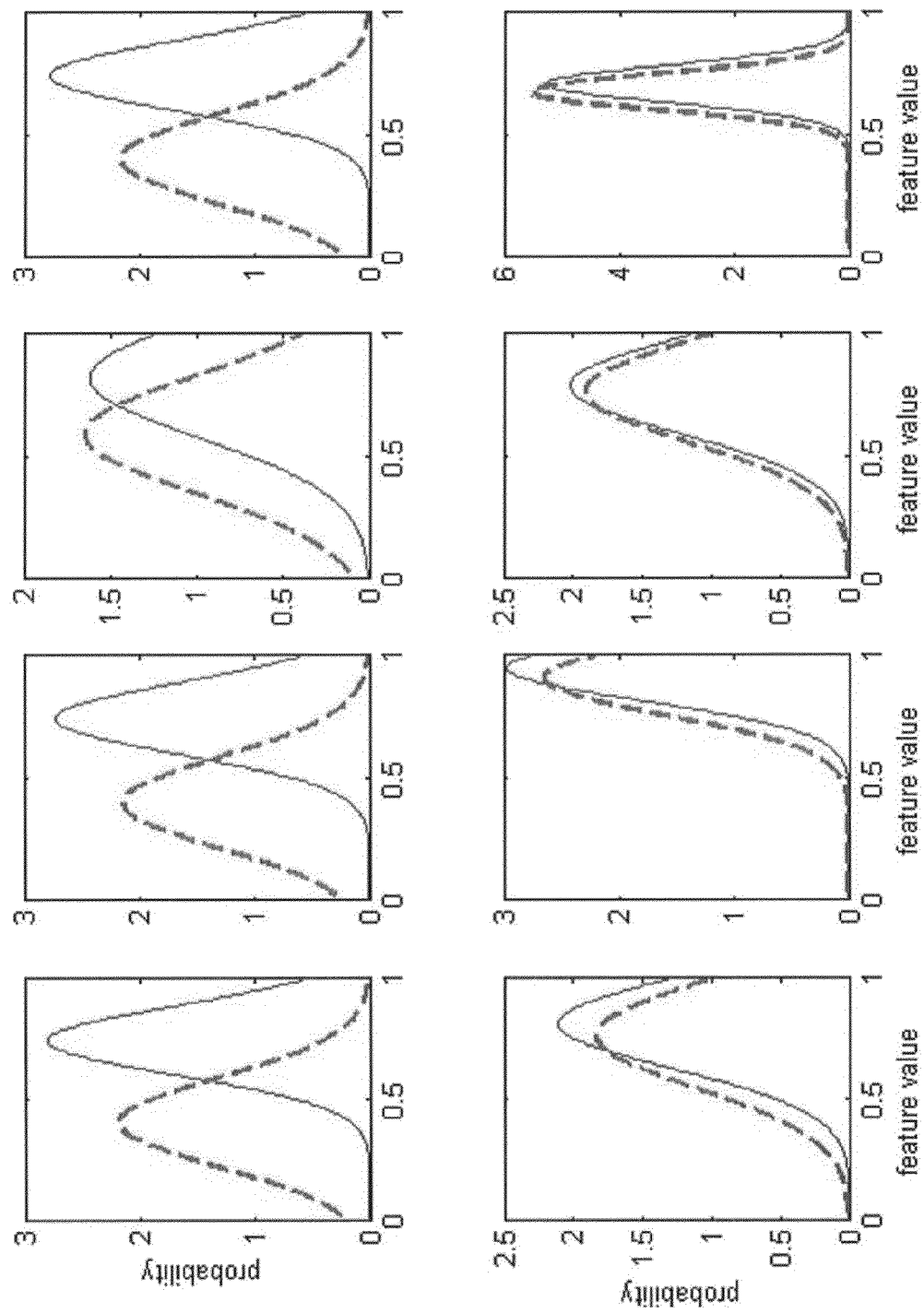
FIG. 3A illustrates examples of feature distributions for eight features for the keyword "floral" in which solid lines represent value distribution of positive samples and dashed lines represent value distribution of negative samples.
Figure 3B:
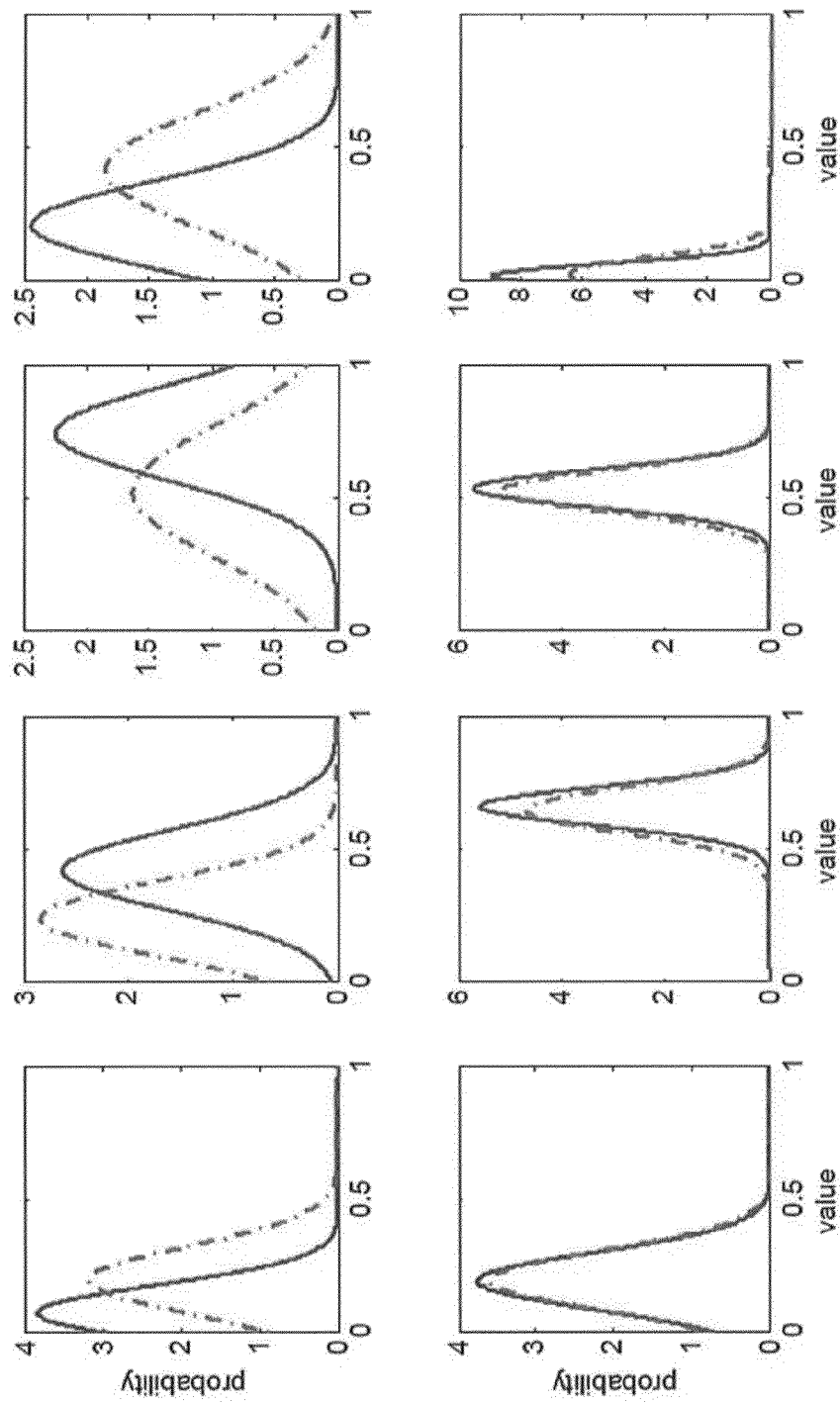
FIG. 3B illustrates examples of feature distributions for eight features for the keyword "dotted" in which solid lines represent value distribution of positive samples and dashed lines represent value distribution of negative samples.

FIG. 3A demonstrates the value distribution of eight different features for the keyword "floral". FIG. 3B demonstrates the value distribution of eight different features for the keyword "dotted". In the figure, the solid line represents distribution of the positive samples, while the dashed line represents negative samples. Both sample sets are fitted to normal distributions for better presentation in the figure. However, when the system quantitatively compares both distributions, the system does not make such an assumption. For the first four texture features, distributions of the positive samples are significantly different from negative samples (e.g. items described by the keyword is statistically different from other items in these features). In contrast, the two distributions are indistinguishable for the other four features (selected from color and shape).

There are overlaps between the distributions of positive samples and negative samples. This indicates that there are items visually similar to the positive items on those "good" features, but they do not have the particular keyword (e.g. "floral" or "dotted") in their descriptions. The system is able to yield back such items without getting false hits (e.g. items with similar colors to the positive samples, but not the "floral" texture).

The difference between two distributions may be quantitatively captured by running a Kolmogorov-Smirnov test across each dimension of feature vectors. The two sample K-S test is commonly used for comparing two data sets because it is nonparametric and does not make any assumption on the distribution. The null hypothesis for this test is that the two samples are drawn from the same distribution. For n i.i.d samples $X_1, X_2, \ldots X_n$ with unknown distribution, an empirical distribution function can be defined as follows:

$$S_n(x) = \begin{cases} 0, & \text{if } x < X_{(1)}, \\ \frac{k}{n}, & \text{if } X_{(k)} \le x < X_{(k+1)}, \text{ for } k = 1, 2, \ldots, n-1 \\ 1, & \text{if } x \ge X_{(n)}, \end{cases}$$

where $X_{(1)}, X_{(2)}, \ldots X_{(n)}$, are ascending values. The K-S statistic for a given function s(x) is $$D_n = \max_x |S_n(x) - S(x)|$$

The cumulative distribution function of Kolmogorov distribution is $$K(x) = \frac{2\pi}{x} \sum_{i=1}^{\infty} e^{-(2i-1)^2 \pi^2/(8x^2)}.$$

It can be proved that $\sqrt{n}D_n = \sqrt{n} \max_n |S_n(x) - S(x)|$ will converge to the Kolmogorov distribution. Therefore, if $\sqrt{n}D_n > k_\alpha = P_r(K \le K_\alpha) = 1 - \alpha$, the null hypothesis for the K-S test will be rejected at confidence level $\alpha$.

Similarly, to determine whether the distributions of two data sets differ significantly, the K-S statistic is $$D_{n,m} = \max_x |S_n(x) - S_m(x)|$$

and the null hypothesis will be rejected at level $\alpha$ if $$\sqrt{\frac{nm}{n+m}} D_{n,m} > K_\alpha$$

The system may use the P-value from the K-S test to measure the confidence of the comparison results against the null hypothesis. For each keyword, the system may calculate a P-value at each dimension of the feature vector. Features with lower P-values demonstrate statistically significant difference between positive and negative groups. For instance, the P-values for the features shown in FIG. 3A, row 1 are: $1.532 \times 10^{-10}$, $1.524 \times 10^{-10}$, $1.899 \times 10^{-8}$, and $1.761 \times 10^{-10}$; and for FIG. 3A, row 2 are: $2.518 \times 10^{-1}$, $3.770 \times 10^{-3}$, $4.350 \times 10^{-1}$, and $5.839 \times 10^{-2}$. The P-values for the features shown in FIG. 3B, row 1 are 0, $3.901 \times 10^{-319}$, $2.611 \times 10^{-255}$, $5.281 \times 10^{-259}$, and for FIG. 3B, row 2: $2.103 \times 10^{-1}$, $1.539 \times 10^{-5}$, $8.693 \times 10^{-4}$, $1.882 \times 10^{-5}$.

Items described by the keywords have significantly different values in those features, compared with items that are not described by the keyword. Therefore, such features are more likely to be coherent with a visual meaning of the keyword, and hence more important to the perception of the keyword. In contrast, items with and without the keyword have statistically indistinguishable values for other visual features, indicating that such features are irrelevant with the keyword.

The system and methods may use the inverted P-value of the K-S test as the weight of each visual feature for each keyword. P-values are usually extremely small, so it is preferred to map the P-value to a normal scale before using it as a weight. Ideally, the mapping function should satisfy the following requirements: (1) it should be a monotone decreasing function: lower P-values should give higher weight; and (2) when the variable decreases under a threshold (conceptually, small enough to be determined as "statistically significant"), the function value should decrease slower. Therefore, two steps of normalization are applied. First, a mapping function is designed as follows:

$$f(x) = \frac{\arctan(-\log(x) - C) + \arctan(C)}{\pi}$$

where c=(max(x)−min(x))/2.

Next, a linear scaling to map the data range from to (0, 1) occurs, rendering itself as the weight vector of the keyword.

By re-weighting visual features for each keyword, the system and methods may amplify the features that are significant for the keyword, while fading out the insignificant features.

Figure 4A:
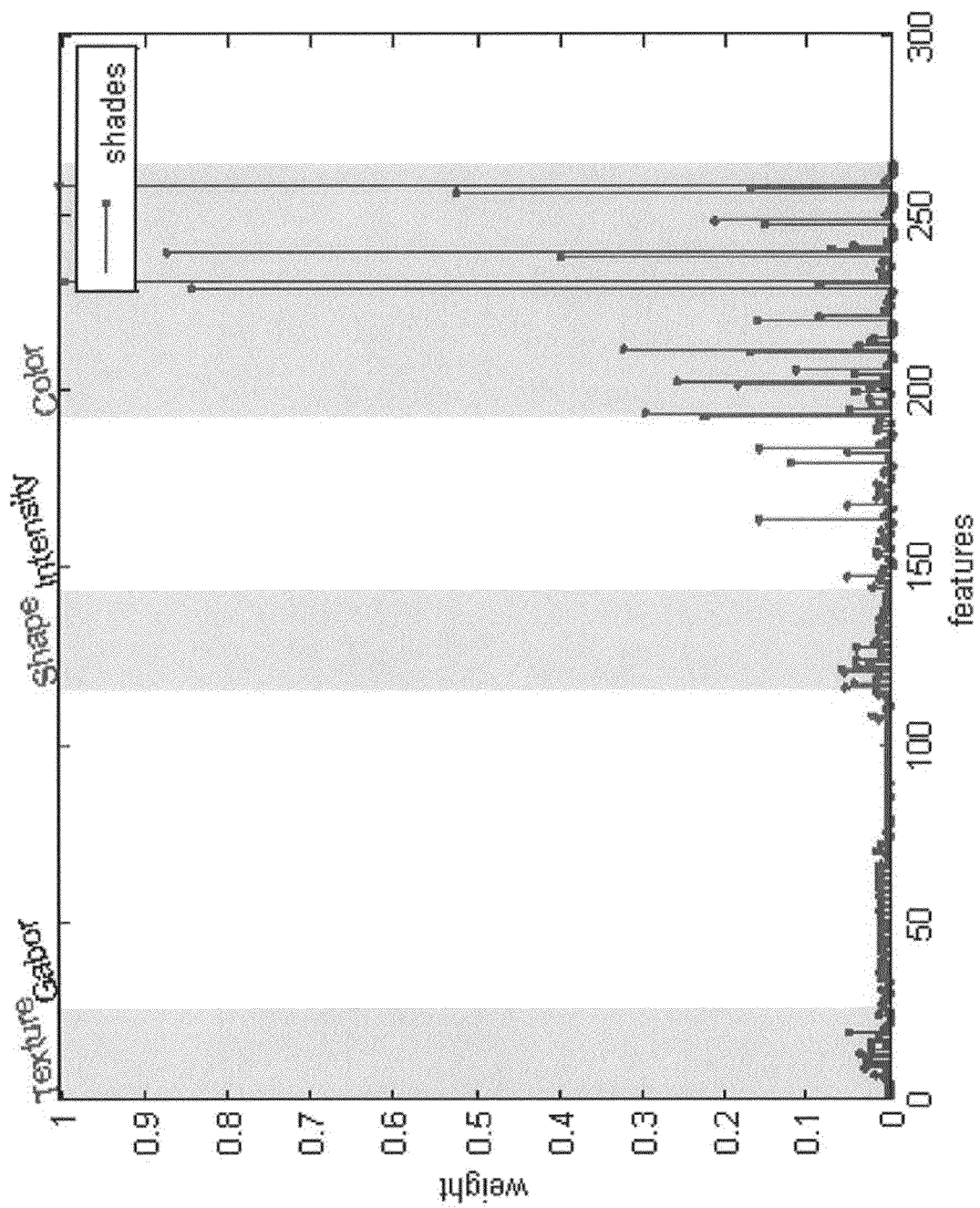
FIG. 4A shows a weight vector for the keyword "shades" according to an embodiment of the invention.
Figure 4B:
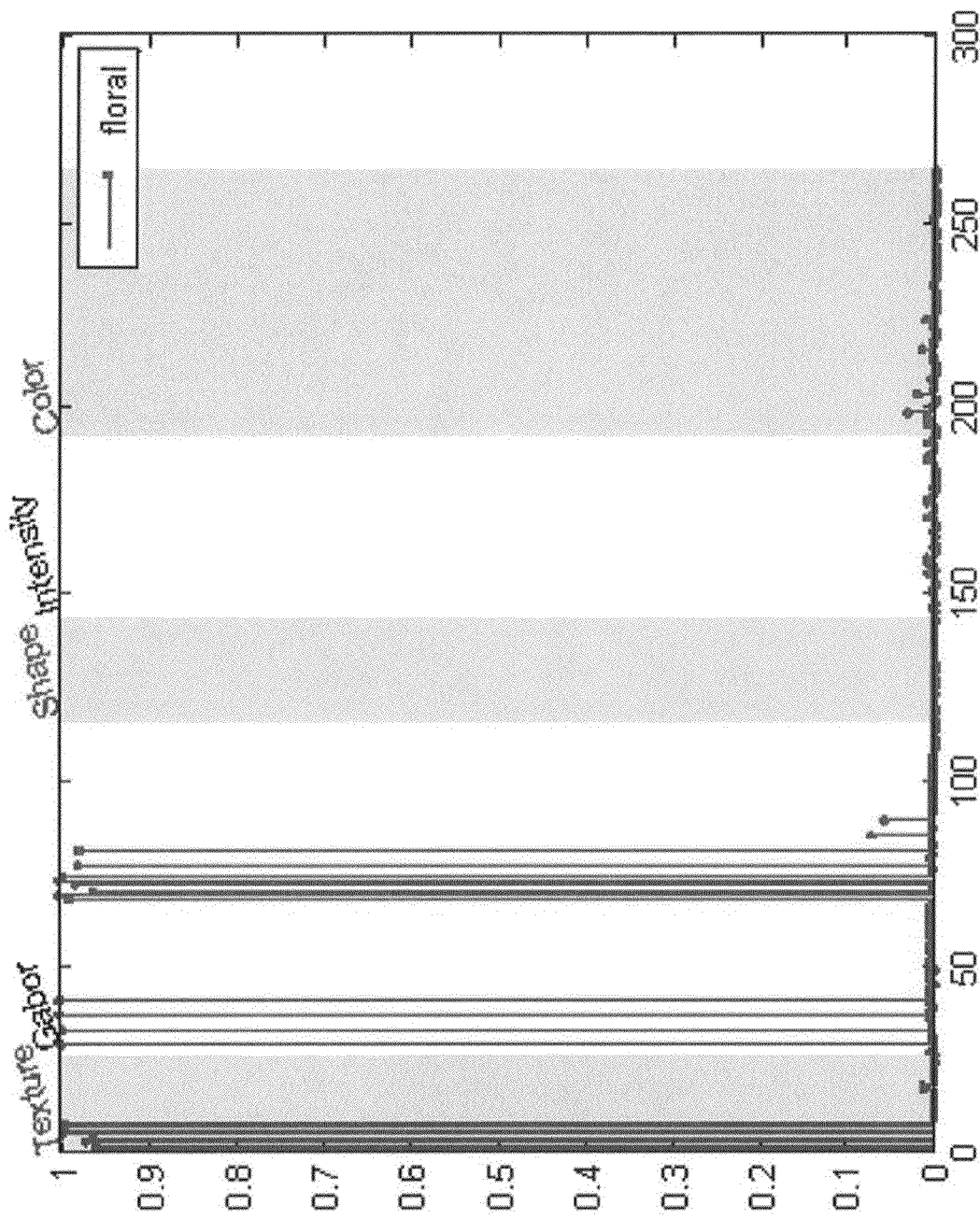
FIG. 4B shows a weight vector for the keyword "floral" according to an embodiment of the invention.
Figure 4C:
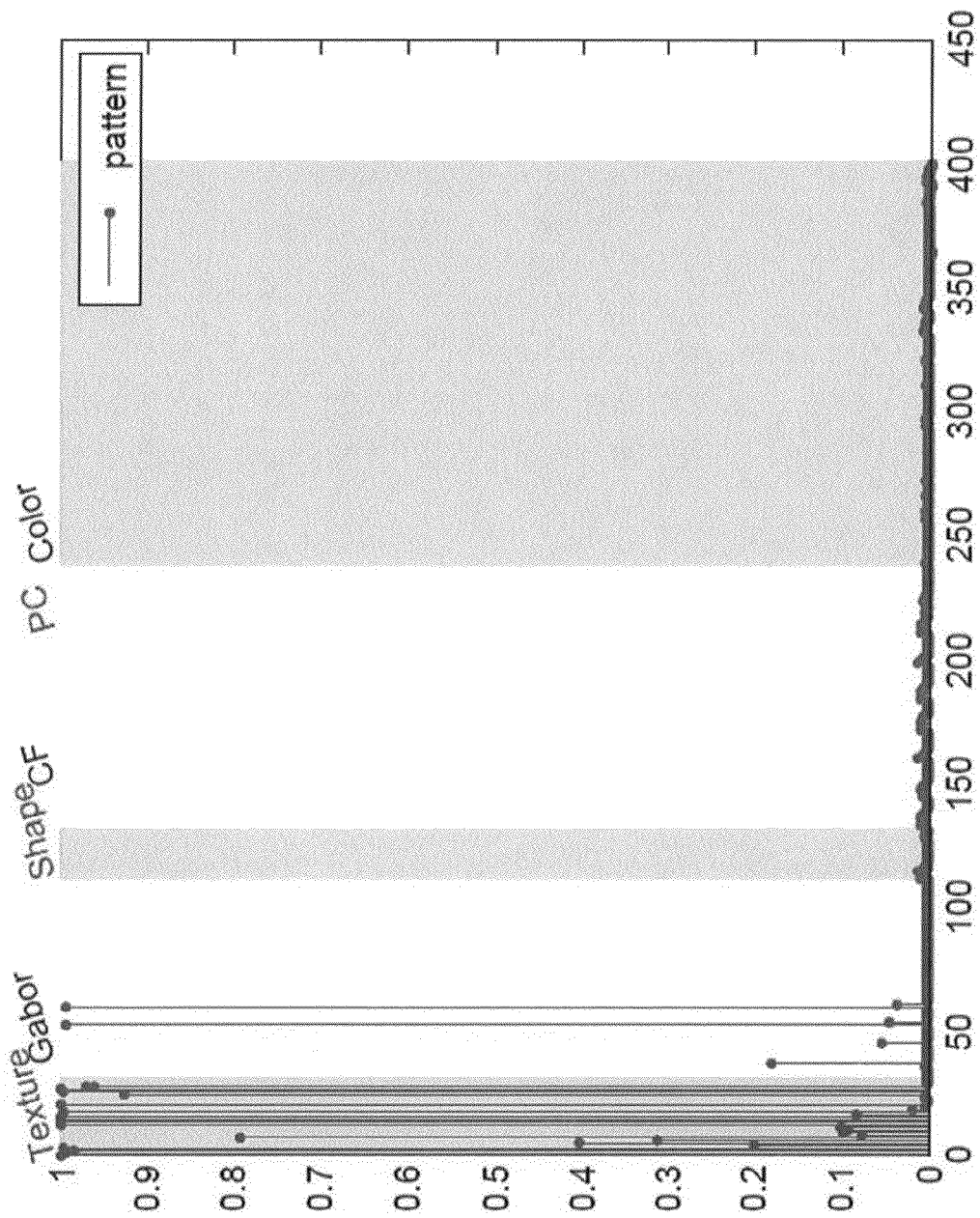
FIG. 4C shows a weight vector for the keyword "shades" according to an embodiment of the invention.
Figure 4D:
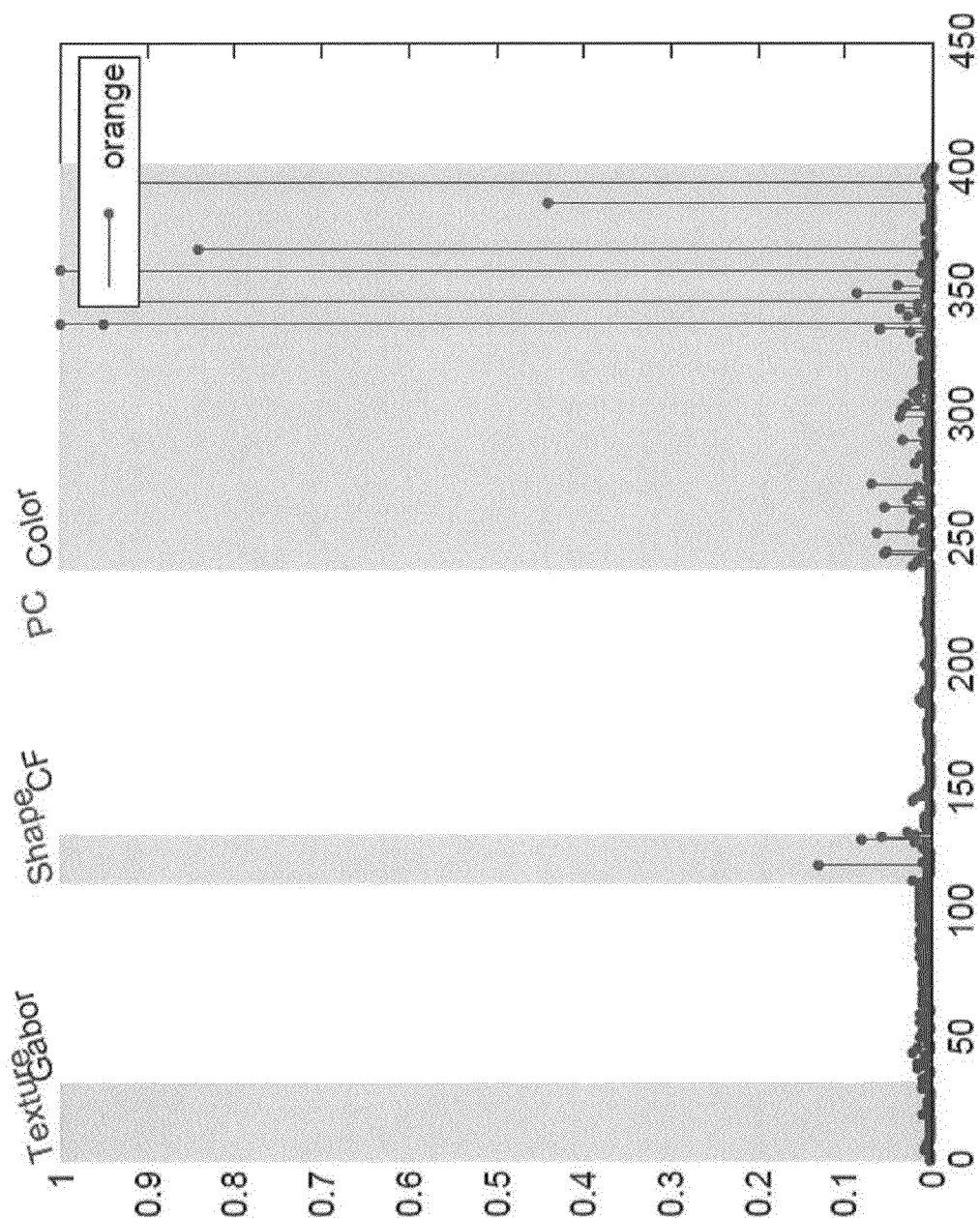
FIG. 4D shows a weight vector for the keyword "pattern" according to an embodiment of the invention.
Figure 4F:
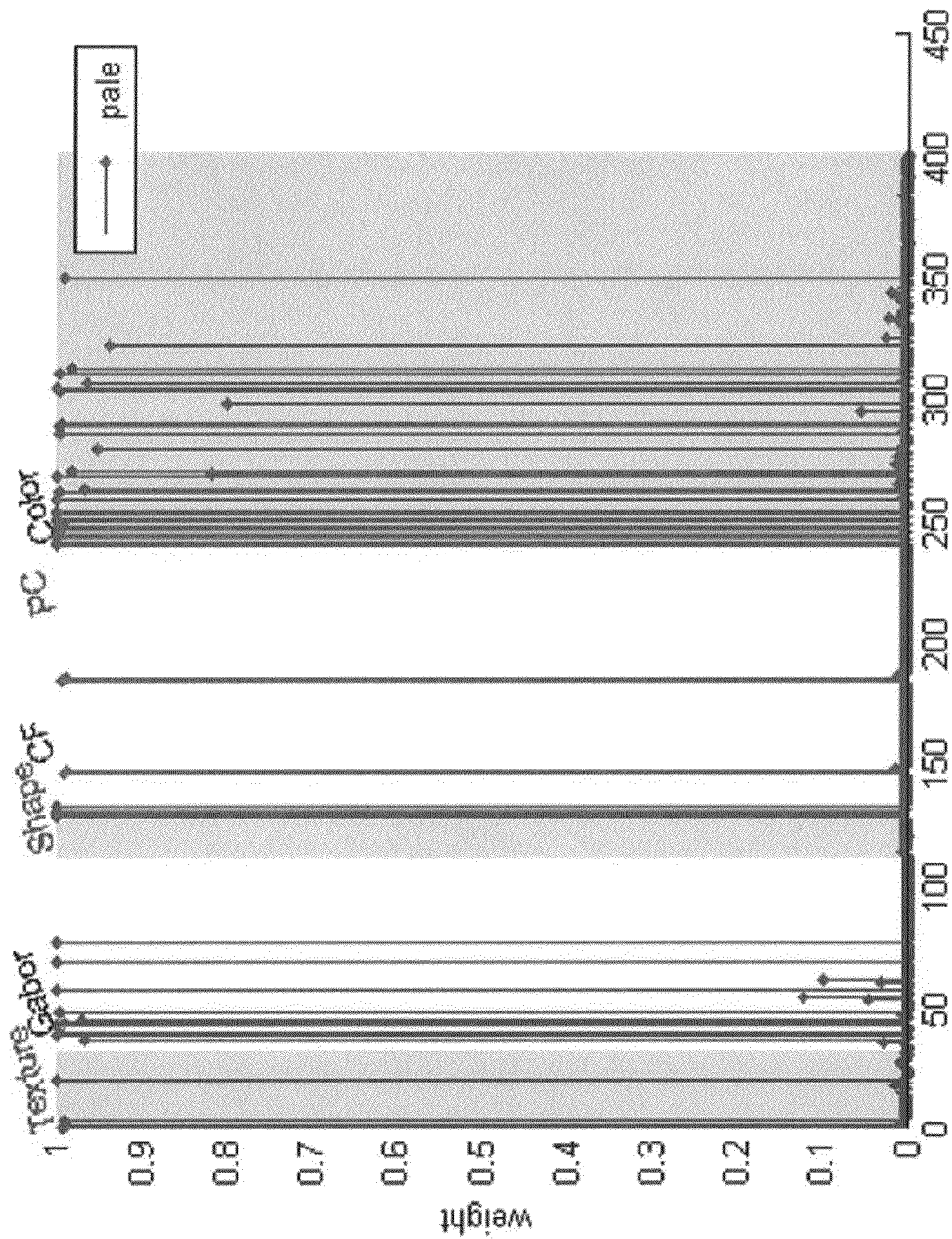
FIG. 4F shows a weight vector for the keyword "decorated" according to an embodiment of the invention.

As an example, FIGS. 4A and 4B show the normalized weight vectors computed from the keywords "shades" and "floral", respectively. In FIG. 4A and FIG. 4B, the X axis represents visual features as follows: (1-26) are texture features: contrast, correlation, homogeneity, coarseness, direction, moment invariant, etc.; (27-115) are texture features from the frequency domain: Gabor texture, Fourier descriptors, etc.; (116-143) are shape features: phase congruency, edge; (144-191) are intensity features: block histogram statistics; and (192-263) are color features. In FIG. 4A and FIG. 4B a large value (higher weight, lower P-value) is generated by statistically different positive and negative samples, indicating that the feature is more likely to have some kind of association with the perception of the term. As shown in FIG. 4A and FIG. 4B, some texture features show more significance in representing the keyword "floral", while the visual features of keyword "shades" are primarily captured by color features. In this way, when a system receives queries with the term "floral", the system may infer that the query is more interested in texture features, while local color and shape features are of less importance. Moreover, the system may further retrieve items with similar visual presentation in such features that do not have a particular keyword in their descriptions.

Figure 5A:
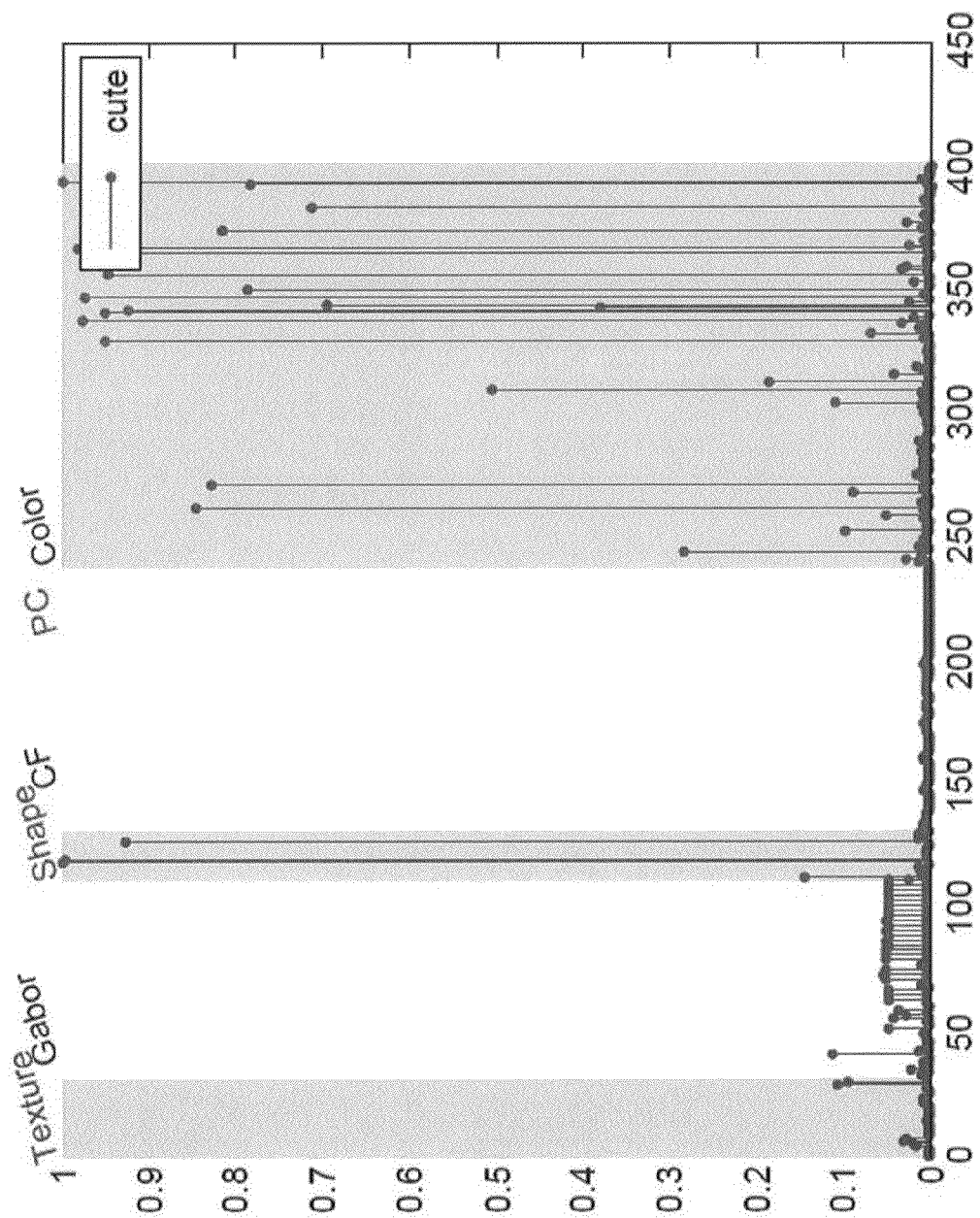
FIG. 5A and FIG. 5B shows weight vectors for the keyword "cute" according to certain embodiments of the invention.
Figure 5B:
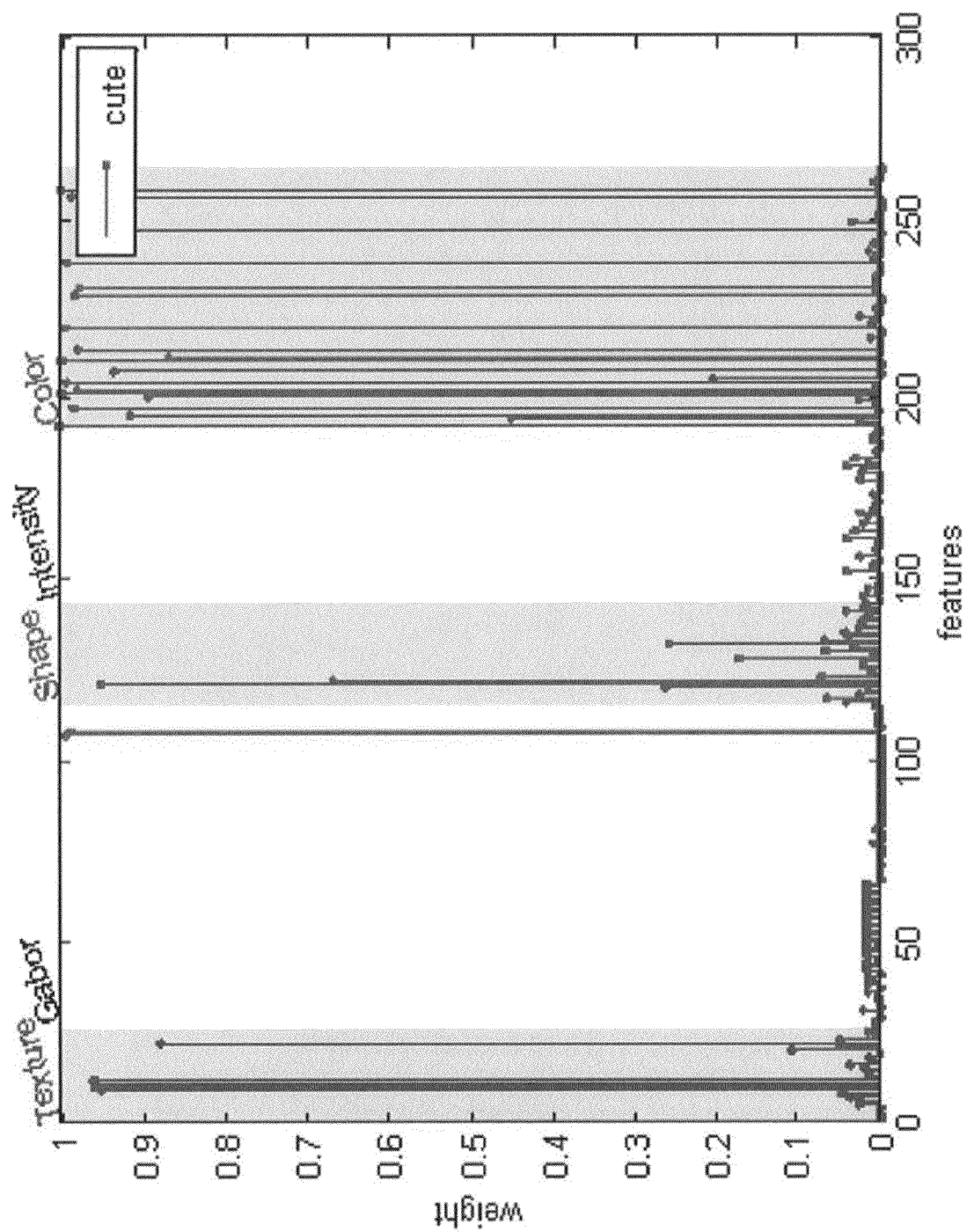

Sometimes it is difficult to describe a visual perception for some keywords. The present system and methods are capable of assessing such perceptions in these circumstances. For instance, FIG. 5A and FIG. 5B show weight vectors for the term "cute". It is not easy for a system to receive an input that summarizes the characteristics of "cute" items. However, when viewing FIG. 5A and FIG. 5B, the visual meaning is obvious. "Cute" items share some distinctive distributions in the color and local textual features. Furthermore, "cute items" are diversified in intensity and high frequency textual features.

Figure 6A:
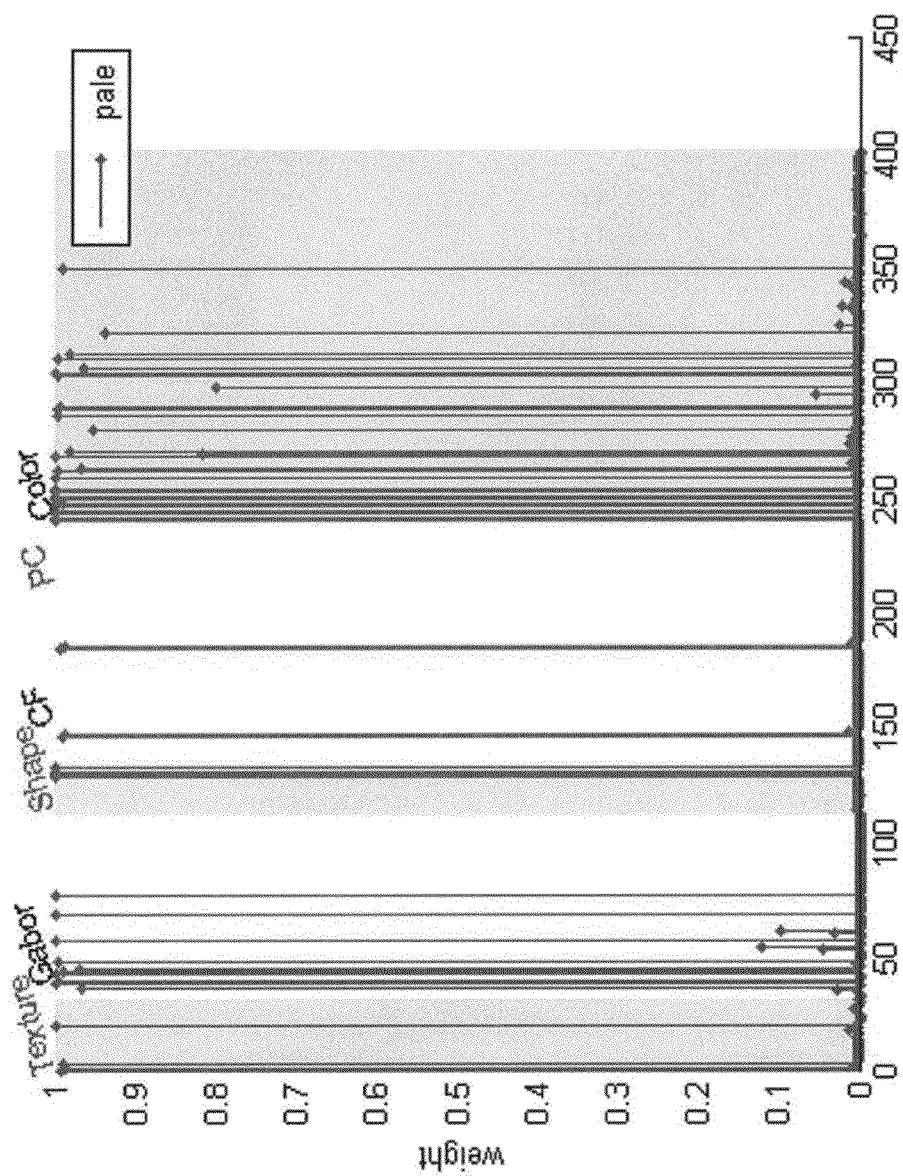
FIG. 6A shows a weight vector for the keyword "pale" according to an embodiment of the present invention.
Figure 6B:
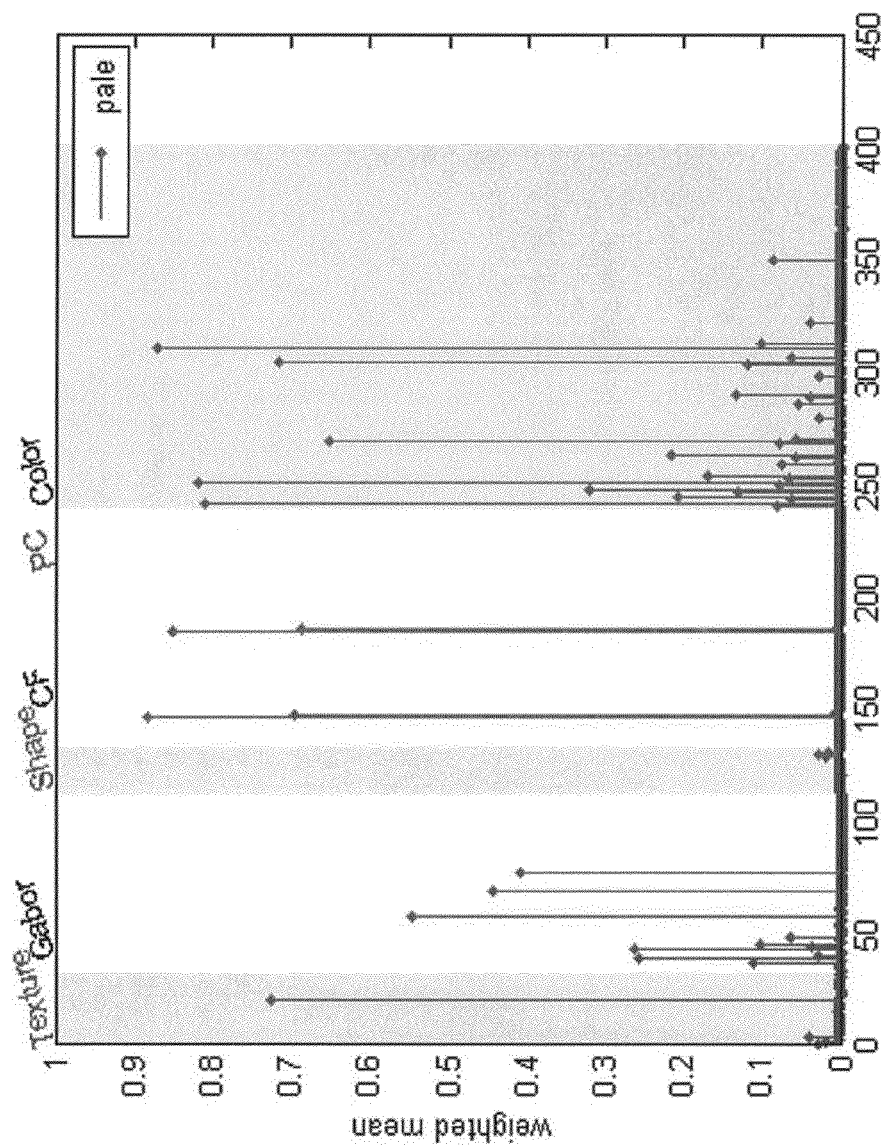
FIG. 6B shows a weighted mean vector for the keyword "pale" according to an embodiment of the present invention.
Figure 6C:
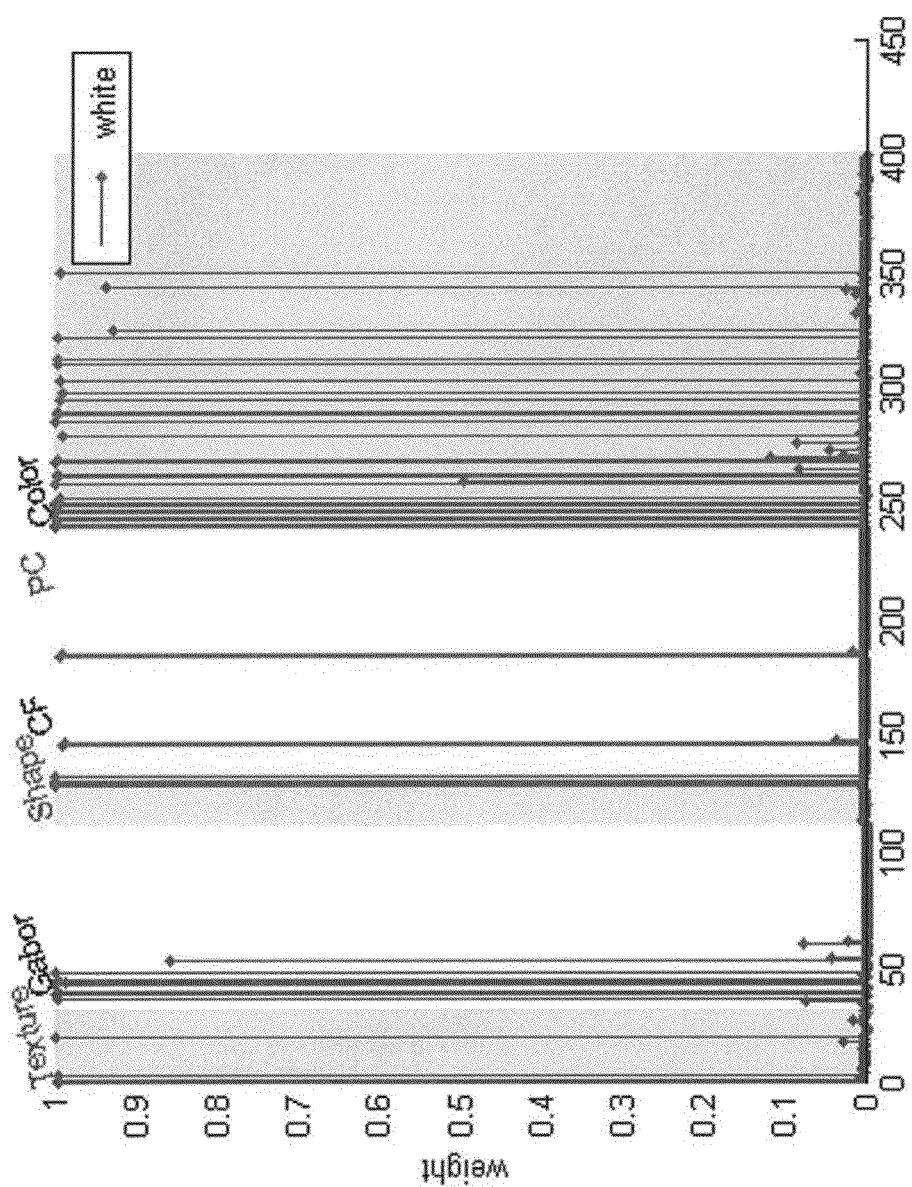
FIG. 6C shows a weight vector for the keyword "white" according to an embodiment of the present invention.
Figure 6D:
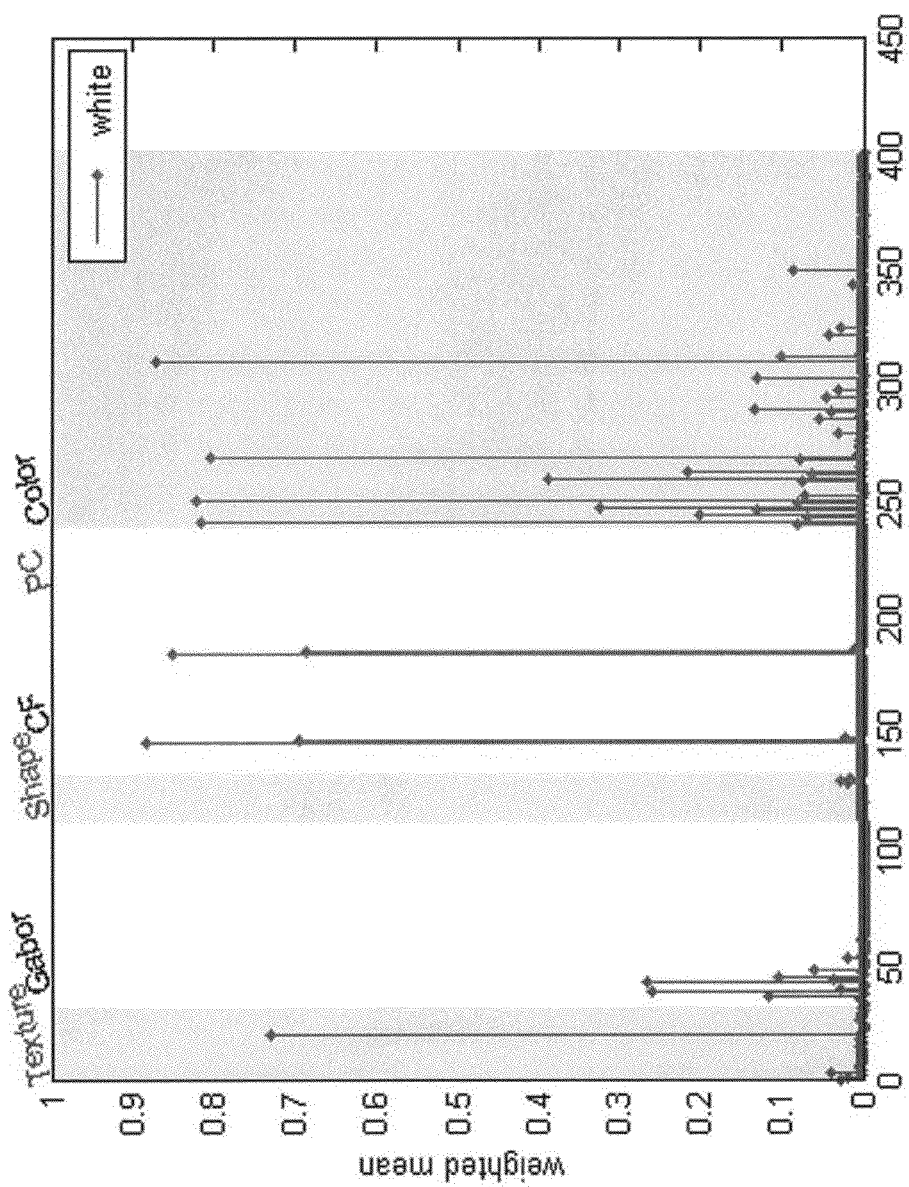
FIG. 6D shows a weighted mean vector for the keyword "white" according to an embodiment of the present invention.
Figure 6E:
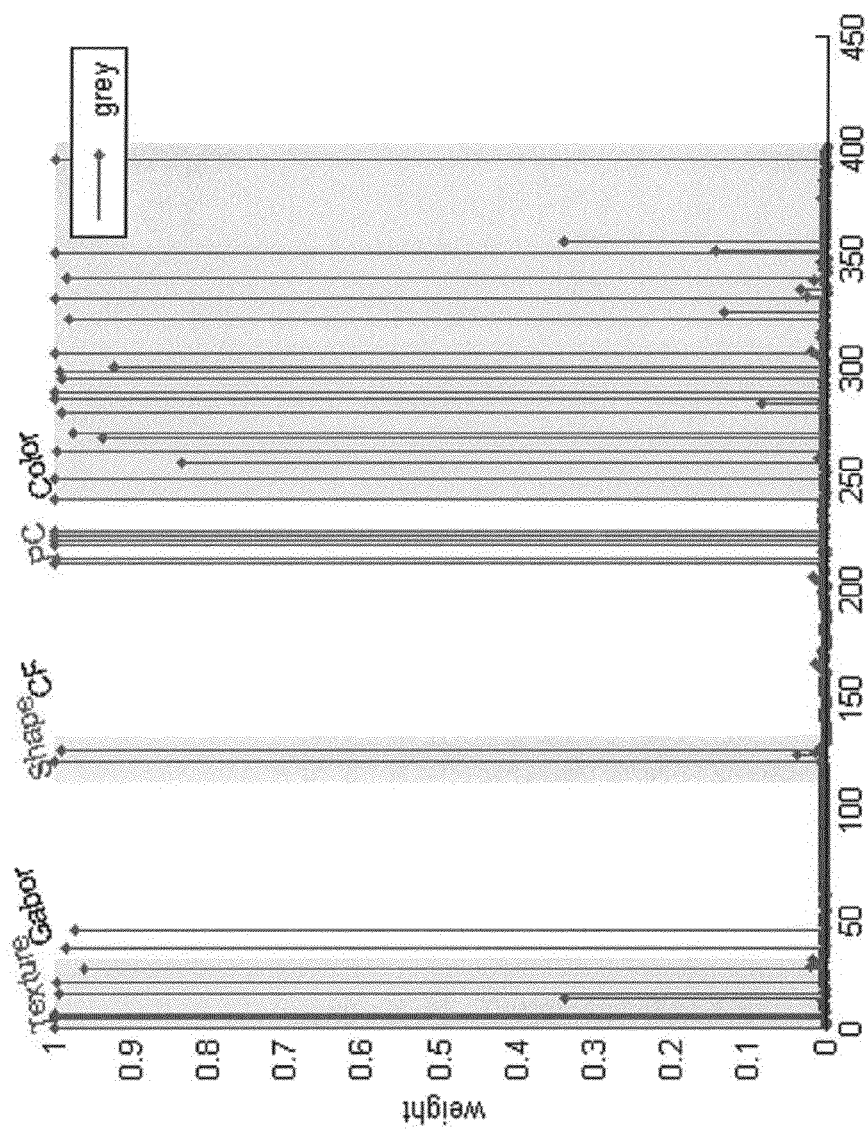
FIG. 6E shows a weight vector for the keyword "grey" according to an embodiment of the present invention.
Figure 6F:
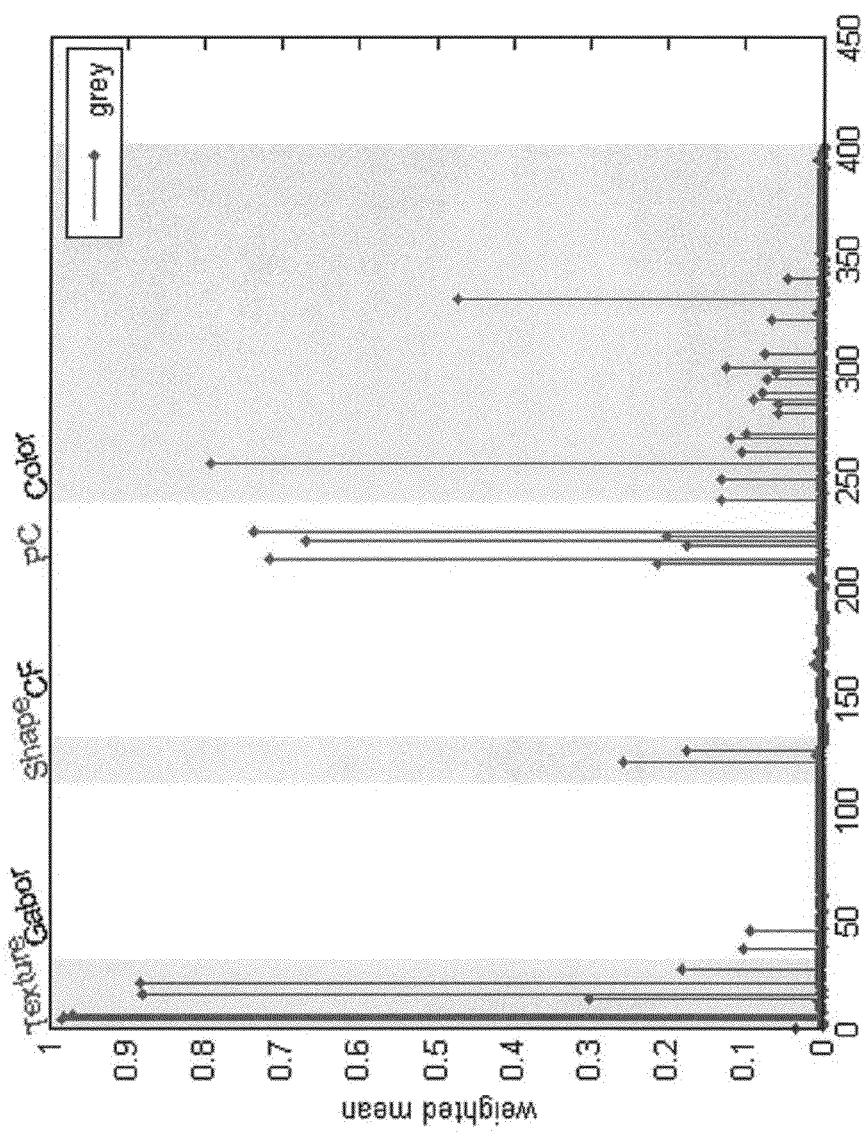
FIG. 6F shows a weighted mean vector for the keyword "grey" according to an embodiment of the present invention.

As illustrated by the weight vectors of terms "pale" (FIG. 6A and FIG. 6B, "white" (FIG. 6C and FIG. 6D) and "grey" (FIG. 6E and FIG. 6F) are quite similar, indicating that they are related to a similar set of visual features in human perceptions (in this case, mostly color features). Meanwhile, the weighted mean vectors of "pale" and "white" are similar, while that of "grey" is very different.

Accordingly, embodiments of the system and methods may establish a connection between keywords and visual features. The system and methods may learn a representation of each term in the visual feature space from a large training sample set, and the feature components that have significance towards the visual perception of the term may be identified.

In CBIR, the entropy of low-level visual features is widely used for feature selection and image annotation. However, such algorithms share one common limitation, namely the semantic gap. The system and methods of the invention solve this problem by utilizing the entropy of feature weights across all keywords.

The system and methods of the invention may generate a weight vector for each keyword, measuring the significance of each image feature dimension towards the keyword. A visual feature that is significant for a number of keywords is a "good" feature, while a visual feature that is insignificant for all keywords is a "bad" feature. Generally, there is not a feature that is significant for almost all keywords. If such a feature existed, the feature would not be a "good" feature since it would not represent any distinctive visual meaning.

For each feature, the system and methods may collect weight values across all keywords (i.e. the ith component of all weight vectors). The entropy of each collection of weights may be used as a quality assessment of the particular feature. An exemplary feature-quality curve is shown in FIG. 11A.

FIGS. 11B and 11C show weight histograms for two difference features. The features shown in FIG. 11B have higher weights for some terms, while the features in FIG. 11C have lower weights for all terms. The first feature in FIG. 11B is able to distinguish the positive and negative sets for some terms, while the other feature in FIG. 11C does not work well for any term. The first feature is certainly better than the other feature. FIG. 11A also shows that the selected features demonstrate good quality, except for a few color features (e.g. those with much lower entropy).

The system and methods of the invention may first employ classic text-based searches to obtain an initial set (since users often provide text queries as input to the system). For each keyword in the user query, the system loads its corresponding weight vector, which is usually generated off-line. Weight vectors from query terms are combined to construct the query weight vector $\vec{\omega}_Q$, which represents intention in the visual feature space. For each item in the initial set, the system may use its visual features to construct a base query $\vec{q}_i$. The system may also obtain an expanded weight vector $\vec{\omega}_E$ from its textual description. Therefore, given a query q, the new query corresponding to the i-th item in the initial set is:

$$\vec{q}'(Item_i, Query) = \vec{q}_i . x(\alpha \cdot \vec{\omega}_Q + \beta \cdot \vec{\omega}_E)$$

where .x indicates component-wise multiplication. The term $\beta$ is set to a much smaller value than $\alpha$, to highlight the intention. In a new query, features that are insignificant to the search terms carry very small values. Hence, a new query could be used to search the item database on the basis of their Euclidean distances, without further enforcing the weights.

The system and methods of the invention are able to build a "visual thesaurus" based on the statistical similarities of the visual representations of the terms.

The system and methods may have two words as similar in terms of "visual semantics" if the words are used to describe items that are visually similar. Since each term is used to describe many items, the similarity may be assessed statistically. The visual representation (mean vector) and weight vector for two terms $t_1$ and $t_2$ are denoted as M-dimensional vectors: $\vec{\mu}_{t1}$, $\vec{\mu}_{t2}$, $\vec{\omega}_{t1}$, $\vec{\omega}_{t2}$ respectively. The similarity between $t_1$ and $t_2$ is calculated as:

$$sim(t_1, t_2) = \frac{\sum_{i=1}^{M} (\mu_{t_1,i} \times \omega_{t_1,i}) \times (\mu_{t_2,i} \times \omega_{t_2,i})}{\left(\sum_{i=1}^{M} \mu_{t_1,i} \times \omega_{t_1,i}\right) \times \left(\sum_{i=1}^{M} \mu_{t_2,i} \times \omega_{t_2,i}\right)}$$

The above equation returns the cosine similarity of two weighted mean vectors: $\vec{\mu}_{t1}$ and $\vec{\mu}_{t2}$. Each vector is weighted by its own weight vector through an element-by-element multiplication, i.e. a weight (significance indicator) is enforced on each feature for each keyword. However, some terms are so popular that the terms demonstrate moderate similarity with many other terms. The system and methods may eliminate these high frequency terms through post-processing. Furthermore, the systems and methods are able to compute antonyms—words with similar weight vectors, but very different mean vectors.

The system and methods of the invention are able to compute the semantic similarities between text terms, and such semantic similarities are coherent with visual perception in a particular application domain. Furthermore, a domain-specific "visual thesaurus" 45 or a "visual WordNet", as shown in Table 1 below may be constructed. This thesaurus could be used for query expansion for existing text-based product search engines in similar domains.

TABLE 1

Visual Thesaurus

| Words | First Few Words in Visual Thesaurus |
|---|---|
| \feminine | bandeau, hipster, breezy, pregnancy, hem, lifestyle, braid, comfy, femininity. |
| \flirty | flirt, bikini, vibrant, effortlessly, pointelle, dressy, edgy, splashy, swimsuit |
| \gingham | subtle, sparkly, floral, gauze, glamour, sassy, surplice, beautifully, pajama |
| \trendy | adorn, striking, playful, supersoft, shiny, nancy, ladylike, cuddly, closure |
| \pinstripe | smock, sporty, khaki, pleat, oxford, geometric, gauzy, ruffle, chic, thong |
| \embroider | suede, crochet, versatility, ultra, corduroy, spectrum, softness, faux, crease |
| \twill | complement, plaid, contour, logo, decorative, buckle, classically, tagless |

After creating a visual thesaurus, certain embodiments may include a weight vector optimization step. As discussed above, product descriptions could be subjective due to personal tastes. Different narrators/retailers may use different words to tag similar objects. Due to the existence of synonyms, false negatives may occur in the negative sets. A false negative is an item that: (1) is actually relevant to the term, (2) demonstrates similar visual features with the positive items, (3) is described by a synonym of the term, not the term itself, and hence is categorized in the negative set of the term. As shown in the "good" features in FIG. 3A and FIG. 3B, there are still overlaps in the feature value distribution of negative and positive samples. Such overlaps will reduce the weight of the corresponding feature towards any of the synonym terms, and possibly decrease search performance. The domain-specific visual thesaurus can help us find both synonyms and antonyms. By merging items described by synonyms, the number of false positive items caused by those synonyms can be decreased. A higher consistency and higher weights on significant features can be obtained. Table 2 below also illustrates a Visual Thesaurus before and after an optimization step is completed.

feature distribution of the combined positive set is cleaner and narrower. By iteratively combining similar keywords in the visual thesaurus, quality of the weight vectors can be improved. The number of synonyms to be merged decreases significantly after each iteration.

Figure 8:
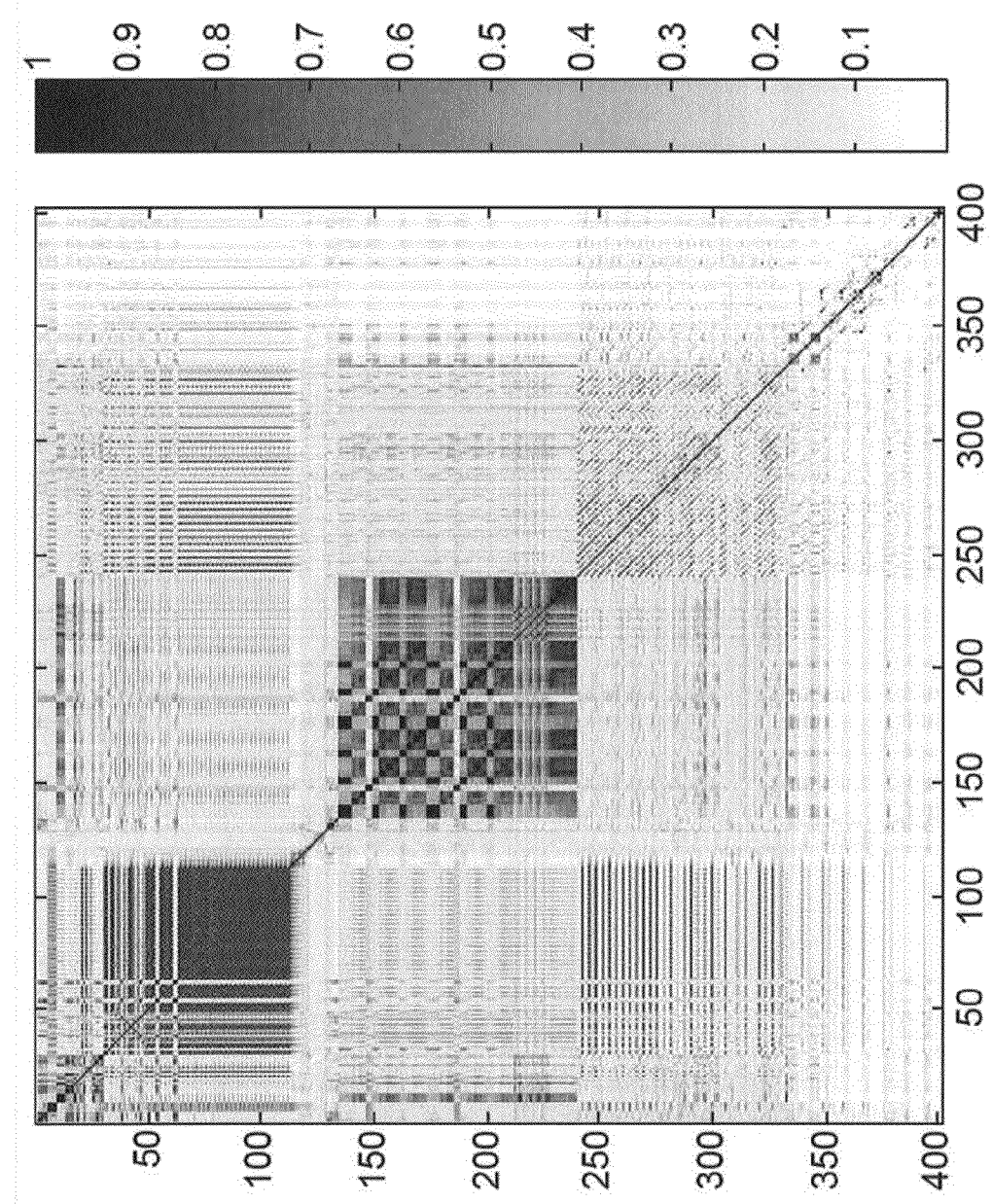
FIG. 8 illustrates an example of pair-wise Pearson product-moment correlation coefficient calculation results.

Certain embodiments may reveal that visual features are correlated. If two features are significant for a similar set of keywords, and insignificant for the others, such visual features are somewhat correlated. To quantitatively study the correlations among the selected visual features, the pair-wise Pearson product-moment correlation coefficient (PMCC) may be calculated for all the features. An example of results are shown in FIG. 8, in which black denotes maximum correlation, and white denotes no correlation. The features are mostly independent, with moderate correlations among same type of features. Often, stronger correlations exist among CF and PC features. Such correlations introduce some computational overhead in the present system, but the impact on search precision is very limited.

Embodiments of the systems and methods according to the present invention may include executing testing and evaluating steps as well.

In one testing scenario, the system is implemented on a database crawled from six selected fashion shopping sites. A 263-dimensional visual feature vector is obtained from the main product image for each item. Both a visual feature and a textual feature pre-processing occur on an off-line basis. For each query inputted into the system, the system calculates the initial result set based on text-based retrieval. Display of the initial result set occurs in a title row of the output. For each item in the initial set, the system expands the query with the textual features and visual features from the item, and enforces the weight vector which infers intention. The query expansion parameters $\alpha$, $\beta$ are set to 0.9, 0.1, respectively. The search results using expanded and weighted query are displayed in columns, with the original item (from initial result set) in the title row.

Figure 9A:
FIG. 9A shows the search results for the keyword "floral" according to an embodiment of the invention.

Examples of the search results are illustrated in a user interface 40 in FIG. 9A. To evaluate the system, a traditional

TABLE 2

Visual Thesaurus

| Words | Top Words in Original Visual Thesaurus | Top Words in Visual Thesaurus after 1 Iteration |
|---|---|---|
| geometric | print, abstract, swirl | swirl, motif, tropical, tree, border, pattern, lively, print |
| swimwear | waters, bench, sands, clear, soak, rings, bandeau | rings, beach, halter, sexier, lounging, bottoms, glitter |
| necklace | warmth, sassy, earring, insulation, dazzling, star, trunk | sassy, impeccably, star, list, canvas, dance, garter, ankles |
| decorated | patchwork, animal, abstract, wild, diaper, border | paisley, prints, animal, gingham, madras, patchwork |
| designed | frame, movement, fashion, stretchy, ease, fitting, finish | texture, spirit, boyfriend, accented, frame, silk, fashion |
| celebrities | partner, crosshatched, well-tailored, win, fraying, alike | crosshatched, belt, fraying, partner, opening, attention |
| shoes | shoe, outsole, sneaker, laces, foot, wedge, shining | shoes, shoe, outsole, sneakers, slide, footbed, sneaker |
| complementary | contrasting, loose, hued, hole, textures, rows, swingy | reverses, textures, memorable, double-layer, colored |

Figure 7:
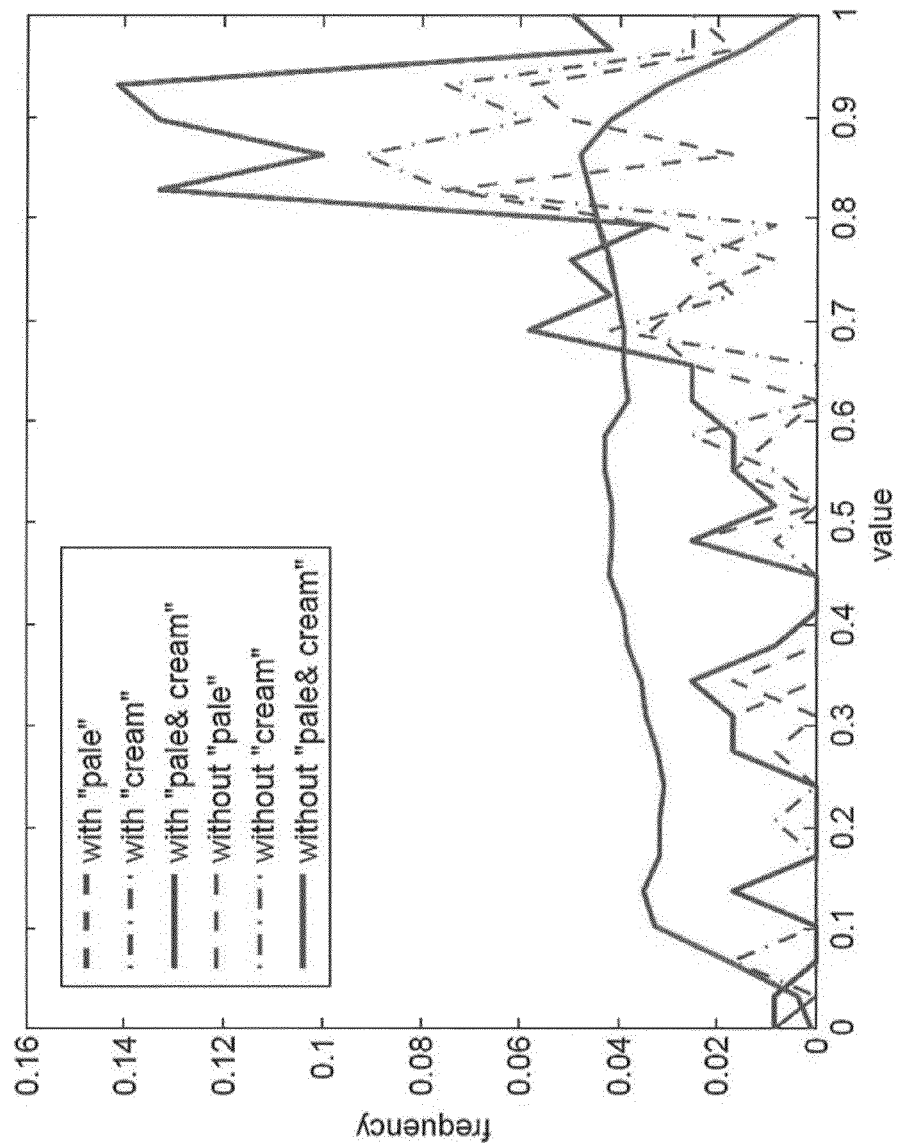
FIG. 7 illustrates a normalized value distribution of a color feature of the positive and negative sets identified by terms "pale" and "cream" according to an embodiment of the invention.

In certain embodiments, an initial visual thesaurus is generated for all the terms in the dictionary. Next, for each term, the items described by a top synonyms are incorporated into the term's positive set. A high threshold is enforced in determining the top synonyms, so that false positives are not introduced into the positive set. The new weight vector is recalculated according to the updated positive/negative sets. An example of the value distribution (normalized) of a color feature of the positive and negative sets identified by terms "pale" and "cream" are shown in FIG. 7 (dashed lines). The distribution of the positive and negative sets from the combined set are also shown. For demonstration, the normalized distribution areas under each curve are a constant. Clearly, the CBIR approach is used as a baseline. The baseline approach uses the same visual features and database as the system of the invention does with one difference—the CBIR approach skips query expansion and feature weighting. With original image features, the baseline approach uses Euclidean distance between two vectors from the visual space. The results are shown in FIG. 9B.

Figure 9B:
FIG. 9B shows the baseline (CBIR) search results for the keyword "floral" according to an embodiment of the invention.
Figure 10A:
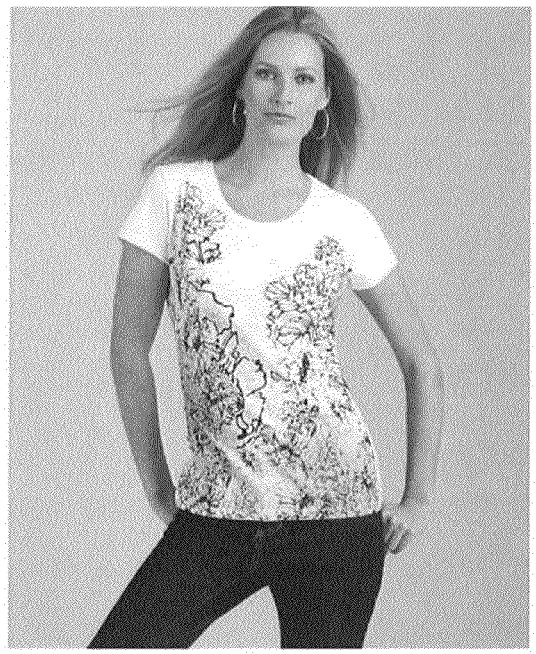
FIG. 10A shows a user selection.
Figure 10B:
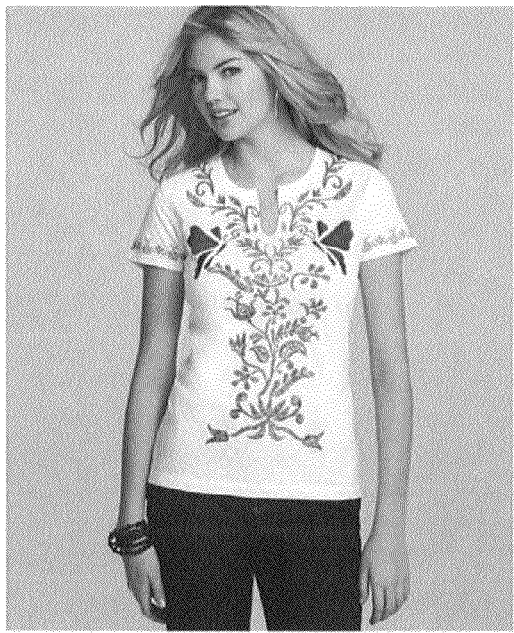
FIG. 10B and FIG. 10C shows the search results for the keyword "printed" according to an embodiment of the invention.
Figure 10C:
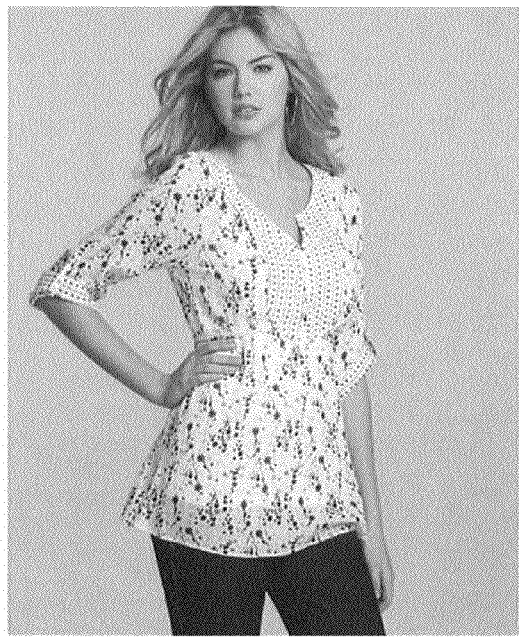
Figure 10D:
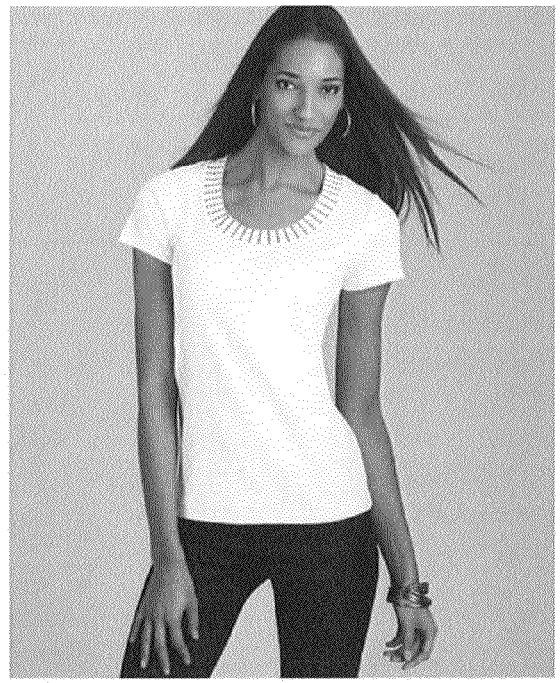
FIG. 10D and FIG. 10E shows the baseline (CBIR) search results for the keyword "printed" according to an embodiment of the invention.
Figure 10E:
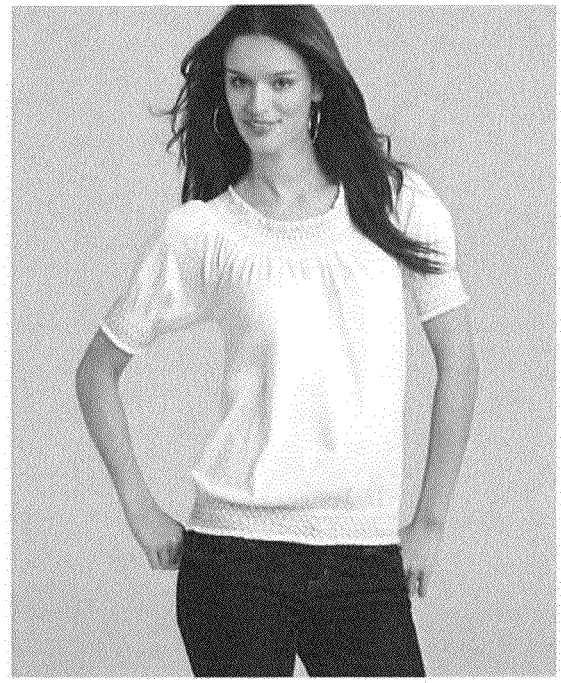

In the example illustrated in FIGS. 9A and 9B, the search results for a query "floral" across the entire database are shown. The term "floral" preserves significant importance in local texture features, especially in the domain of frequency. Therefore a query with "floral" has emphasis on the local texture features, while decreasing the weight of other features such as color, shape and intensity features. FIG. 9A illustrates the results of the system of the invention. In comparing the first column of FIG. 9A and the second column of FIG. 9B, the first seven items retrieved by the system of the present invention share high frequency local texture features, while items retrieved in the Baseline result set deviate their emphasis onto the local color and shape features. Moreover, without semantic restriction in the visual space, the second column of the baseline system is dominated by color features, which explains the retrieval of the first four blue images. The last two columns are essentially similar to the condition of the first group, with one difference—the system of the present invention filters out the background noise, and hence the system gives a higher recall than conventional systems.

FIGS. 10A-10E illustrate a comparison between a user selection (10A), search results from an embodiment the present invention (10B and 10C), and conventional method such as CBIR. The results returned by the present invention highlights the features that are coherent with "printed", and fades out features that are insignificant to the term. The present invention results share some local texture features ("printed" patterns). Meanwhile, although CBIR results are visually similar with the initial selection, they do not exhibit any relevance with "printed", instead, color and shape features dominates visual similarities. The present invention clearly incorporates user intention behind the text terms, and is able to select relevant visual features that are consistent with human perceptions.

Meanwhile, compared with text-based search, embodiments of the present invention significantly increase recall by yielding items that do not contain query terms. Table 3 shows three groups of results for query "printed". Except for the initial set (retrieved by text search), there are only 3 items that contains "printed" in title or descriptions. All other items are only retrievable by visual features.

TABLE 4

Names of Similar Items

| \Girls Floral Applique Dresses | \Women's Floral Watercolor Scarves | \Floral pleated dress |
|---|---|---|
| Girls Slub-Knit Jersey Sundresses | Women's Abstract Floral-Print Scarves | Gingham crinkle dress |
| Girls Gauzy Ruffle-Tiered Dresses | Women's Lightweight Applique Scarves | Crawler dress |
| Girls Surplice Babydoll Dresses | Women's Embroidered-Eyelet Scarves | Pleated pear dress |
| Girls Metallic-Embroidered Tiered Dresses | Women's Lightweight Tonal Scarves | Chevron striped jumper dress |
| Girls Smocked Metallic-Stripe Dresses | Women's Striped Linen-Blend Scarves | Drop-waist bubble dress |
| Girls Striped Jersey Tube Dresses | Women's Polka-Dot Silk-Blend Scarves | Pintucked eyelet dress |

The results demonstrate patterns that fit the perception of the query terms. However, not all of the returned items have the term in the descriptions. Some items are retrieved by visual features. Moreover, if the system only uses the visual features from the initial result set (row 1) as the query, the results will drift away from intention, which is represented by the query terms. Many other items have a higher overall visual similarity with the items in the initial set. Due to the weighting approach, the system of the invention may infer the implicit intention behind the query term and pick up a smaller subset of visual features that are significant to such intention, and therefore yield better results than conventional image search systems.

It appears that pure text-based retrieval will miss many relevant items that do not have the term in the descriptions. Also, if only visual features from initial set ($q_i$) are used, the results will drift away from user intention. Embodiments of the present invention are able to infer the implicit intention

TABLE 3

Names of Similar Items

| Q | Black printed jersey caftan dress | Short sleeve printed tunic top | Red printed chiffon layered mini dress |
|---|---|---|---|
| 1 | Lemongrass floral silk v-neck dress | Flutter short sleeve striped tee | Blue printed chiffon halter dress |
| 2 | Navy printed silk racerback dress | Crochet scoopneck burnout tee | Snow floral stretch cotton beaded dress |
| 3 | Black geometric printed sateen dress | Short sleeve plaid snap front | Sangria chevron pointelle knit tank dress |
| 4 | Lagoon sequined mesh racer dress | Printed mesh drop-waist bubble dress | Cobalt lotus cotton tiered ruffle dress |
| 5 | Charcoal studded jersey panel dress | Short sleeve embroidered scoopneck top | Pink blossom silk flutter sleeve dress |
| 6 | Grey plaid belted ruffle shirt dress | Sleeveless Braided Scoopneck Top | Purple cotton graphic print ring dress |

Figure 12A:
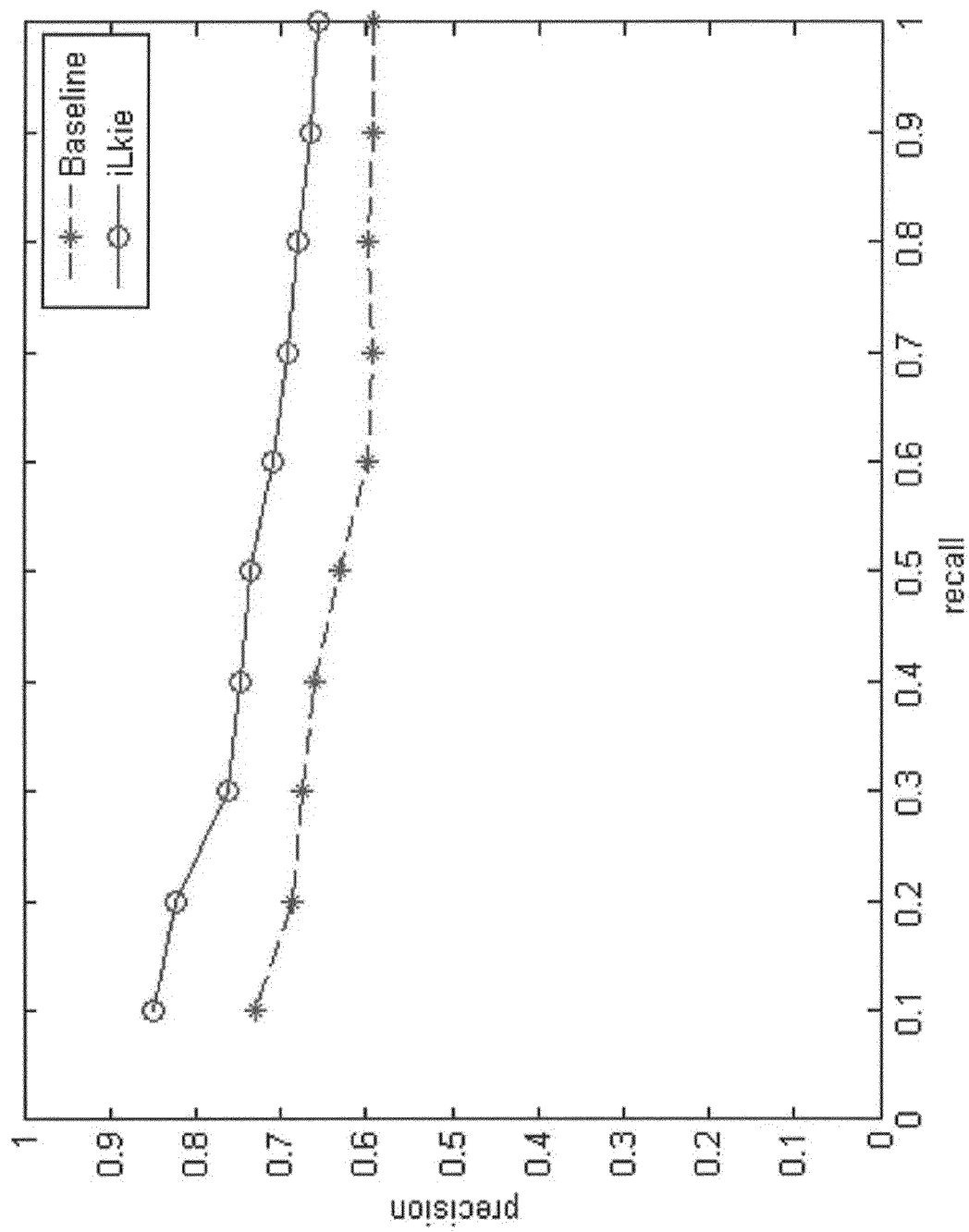
FIG. 12A shows a precision-recall curve of an embodiment of the present system and a baseline CBIR system.

A text based image retrieval ("TBIR") with random keywords is conducted to further evaluate the system. Next, the quality of the top 30 similar items across 50 items in the initial result set (as a first row of the interface) is judged. Each item is marked with a Boolean value, based on each item's relevance to the query. Then, the system's precision and recall is calculated. In a similar way, the quantitative evaluation of the Baseline approach is obtained. A Precision-Recall Curve illustrating the advantage of the system of the present invention is shown in FIG. 12A.

In comparison with the traditional text-based search, the system of the present invention has a clear advantage over search recall. Particularly, the system of the present invention is able to retrieve items that do not contain query terms in their description. To compare the system versus a conventional system, the text information of all the items returned by the present invention is collected. Table 4 below shows three group of items retrieved by the keyword "floral". Except for the initial results set, there is only one item that contains the query term (in both the title and description fields).

behind the queries, pick up a smaller subset of visual features that are significant to such intention, and yield better results.

Figure 12B:
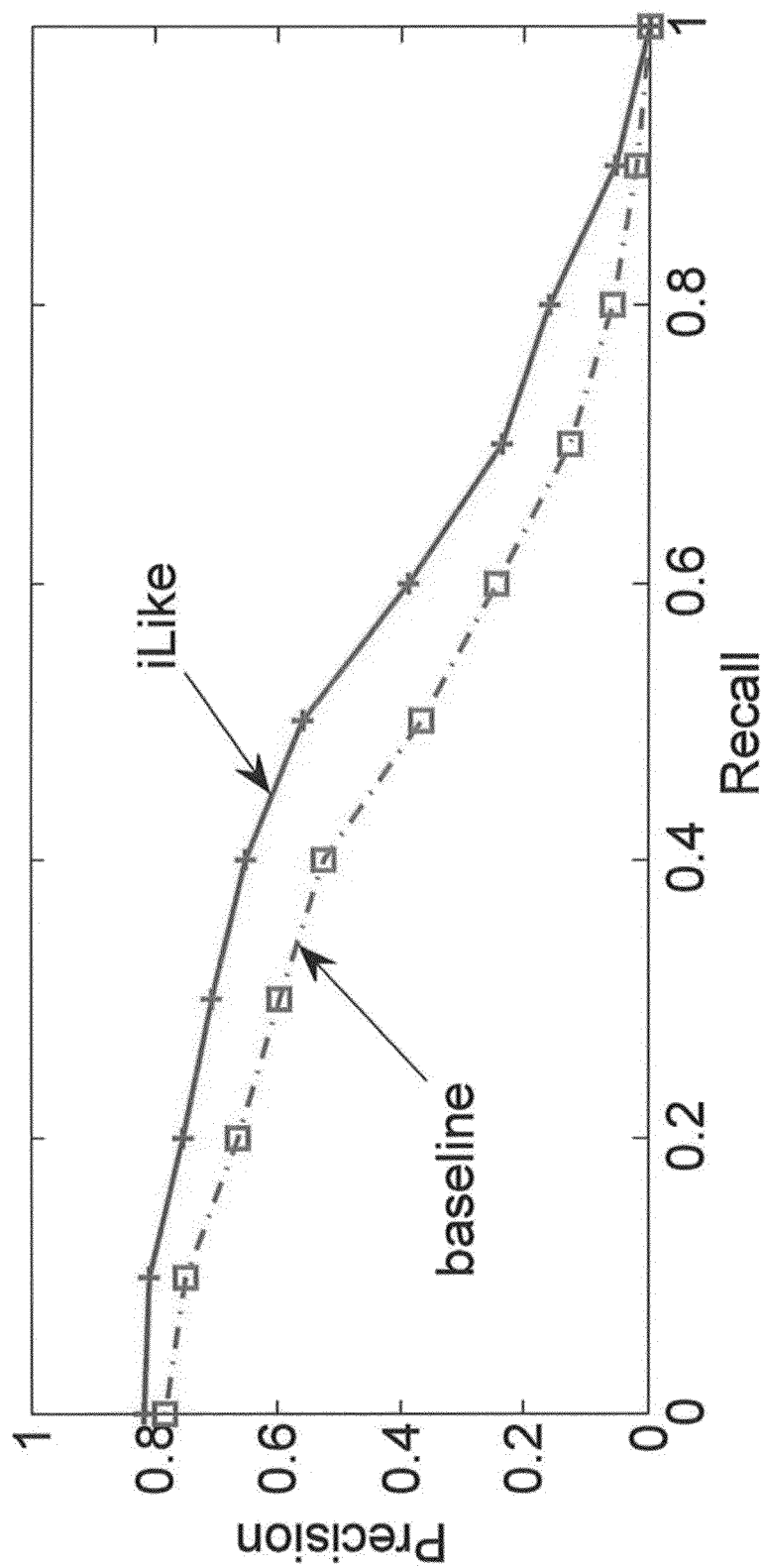
FIG. 12B shows a precision-recall curve of an embodiment of the present invention and a baseline CBIR system.
Figure 13B:
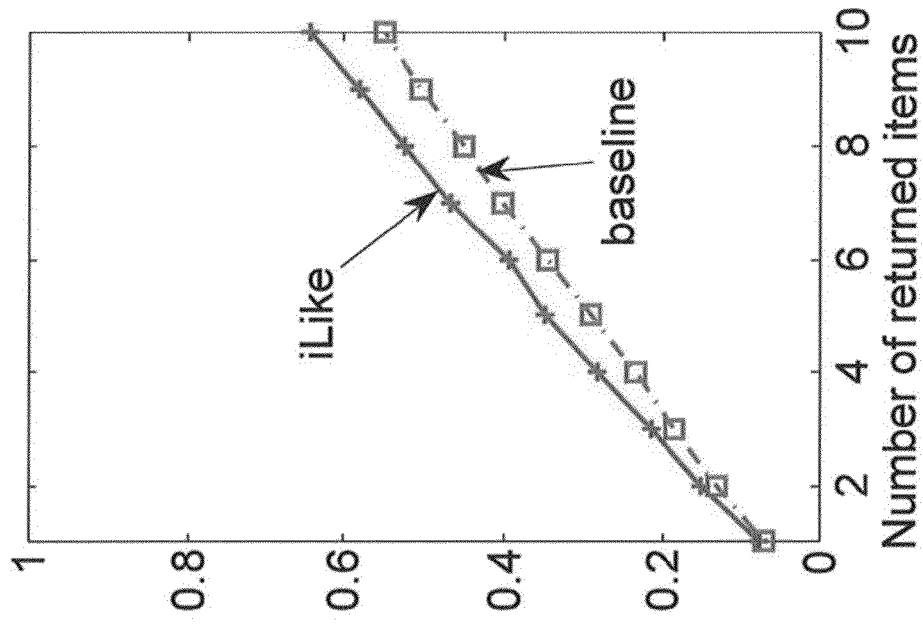
FIG. 13B shows a recall-rank curve comparing multiple search systems.
Figure 13A:
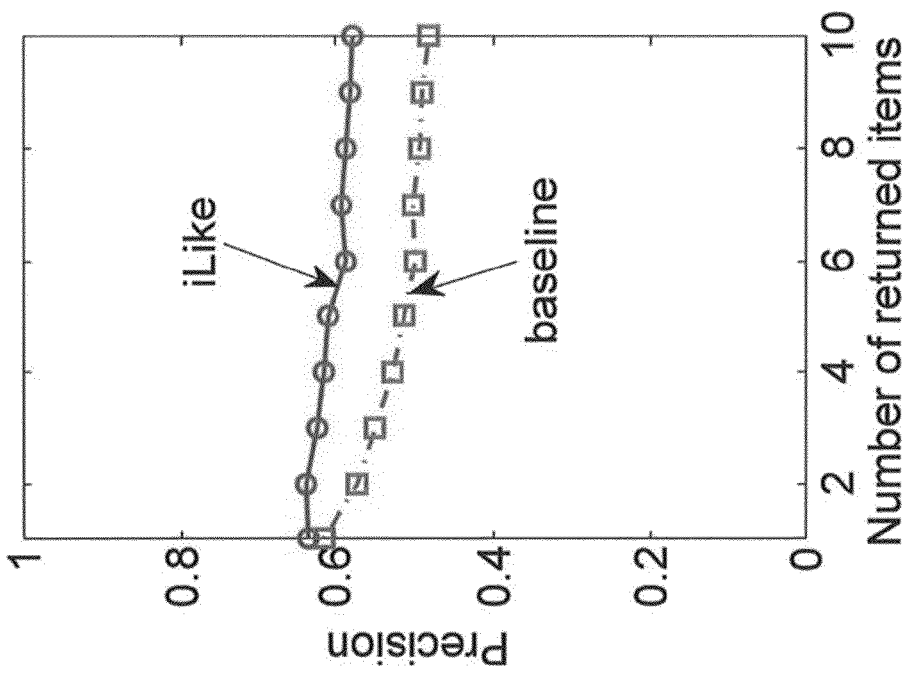
FIG. 13A shows a precision-rank curve comparing multiple search systems.
Figure 14A:
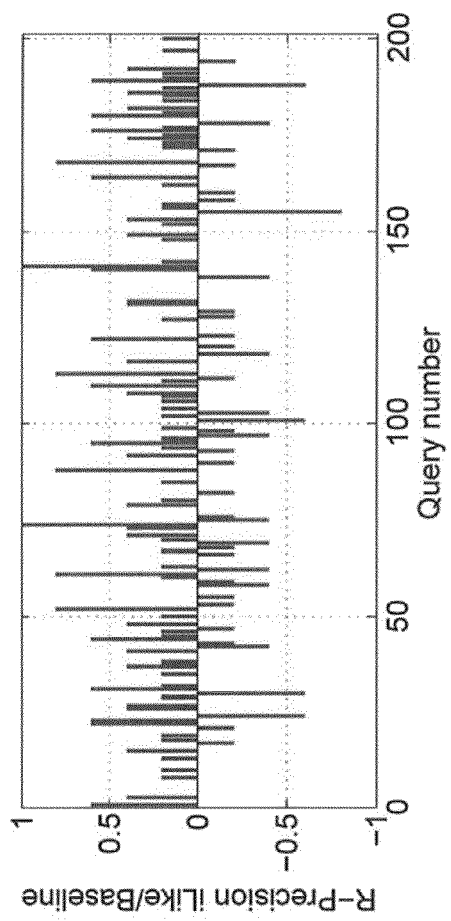
FIG. 14A and FIG. 14B illustrated R-precision histograms for R=5 and R=10, respectively.
Figure 14B:
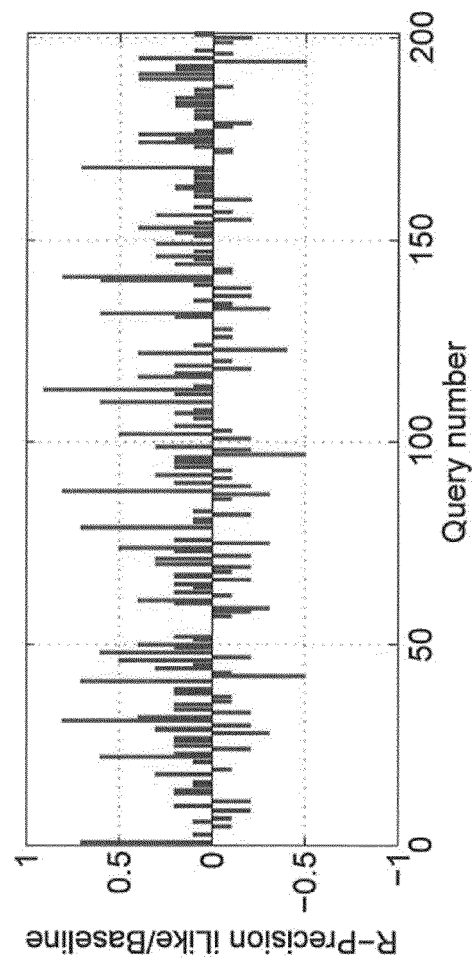

A user-based evaluation method may also be incorporated into the present invention. Such methods may include surveys for text queries in the form of "adjective+noun" (e.g. "pattern shirts") and then analysis of the results compared to other systems. Such a method compared to a CBIR system may provide results such as the average precision-recall curve illustrated in FIG. 12B. Also, a precision histogram presents the differences between the precision of an embodiment of the present invention—termed "iLike"—and CBIR system at recall R. Multiple systems also may be compared to obtain a precision-rank curve as illustrated in FIG. 13A or a recall-rank curve as illustrated in FIG. 13B. FIG. 14A and FIG. 14B illustrate precision histograms $RP_{A/B}(i)=RP_A(i)-RP_B(i)$; 14A, R=5, 14B, R=10, for a random set of queries.

Certain embodiments of the system of the invention may implement more focused crawlers and parsers. With more items in a database, the system may better assess visual meanings of text terms. Second, the system may employ more advanced statistical learning approaches to manipulate the large number of samples. The system may also employ more visual features for product images. Due to the effectiveness of text-guided visual feature discrimination (weighting), it is possible to add all kinds of visual features, and let the system pick "good" visual features.

In certain embodiments, the K-S test is used to derive semantic meaning in low-level visual features. K-S based feature weighting is a linear transformation of the visual feature space with respect to each term in the dictionary. Advantageously, it provides intuitive mapping from high-level concepts to low level features with low overhead. However, other supervised or unsupervised learning techniques could also be used. Examples of such techniques include neural networks, support vector machines, Bayesian, bootstrapping, and other methods known in the art.

Figure 15:
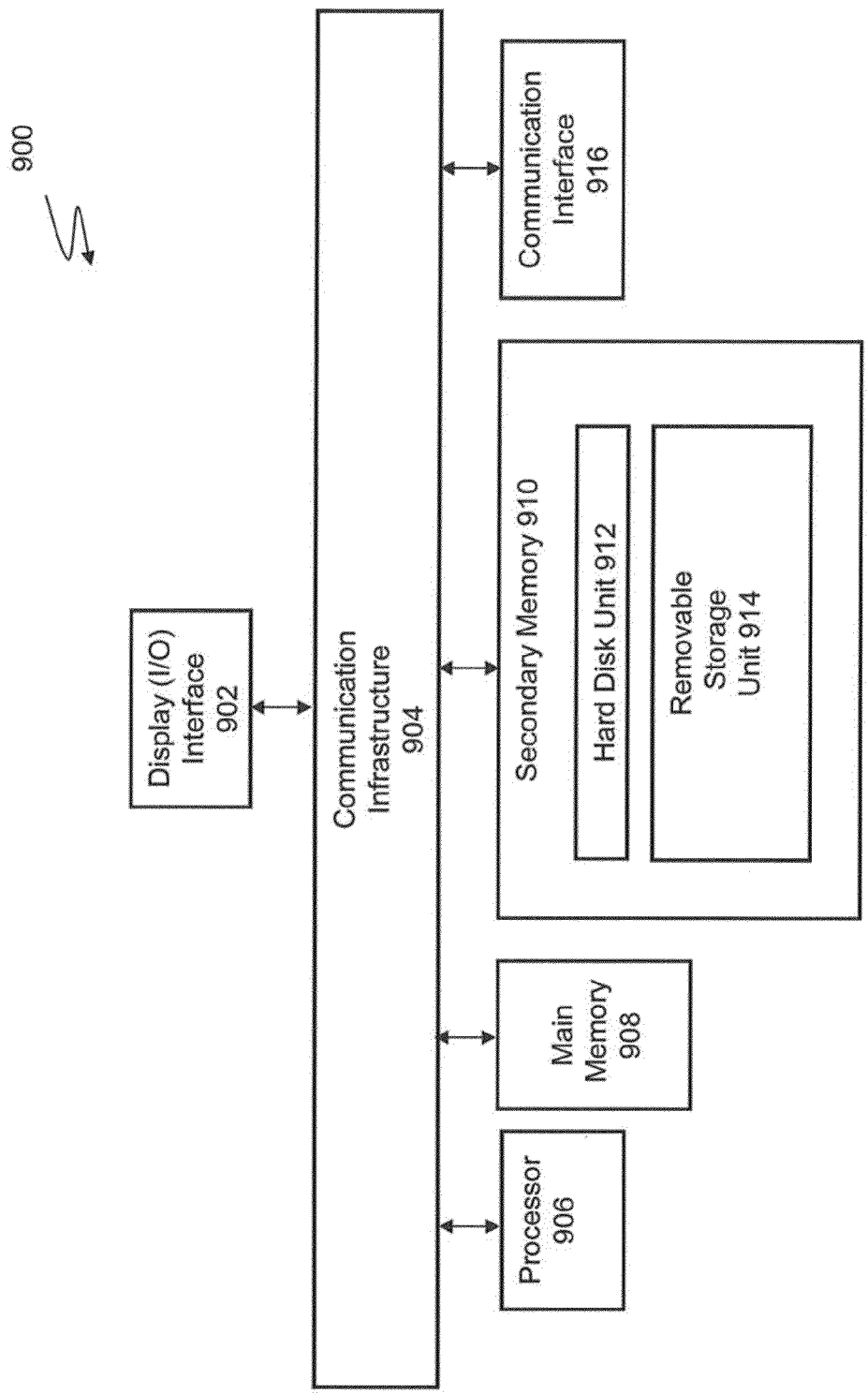
FIG. 15 illustrates an exemplary computer system that may be used to implement the methods according to the invention.

FIG. 15 illustrates an exemplary computer system 900 that may be used to implement the methods according to the invention. One or more computer systems 900 may carry out the methods presented herein as computer code.

Computer system 900 includes an input/output display interface 902 connected to communication infrastructure 904—such as a bus—, which forwards data such as graphics, text, and information, from the communication infrastructure 904 or from a frame buffer (not shown) to other components of the computer system 900. The input/output display interface 902 may be, for example, a keyboard, touch screen, joystick, trackball, mouse, monitor, speaker, printer, any other computer peripheral device, or any combination thereof, capable of entering and/or viewing data.

Computer system 900 includes one or more processors 906, which may be a special purpose or a general-purpose digital signal processor that processes certain information. Computer system 900 also includes a main memory 908, for example random access memory ("RAM"), read-only memory ("ROM"), mass storage device, or any combination thereof. Computer system 900 may also include a secondary memory 910 such as a hard disk unit 912, a removable storage unit 914, or any combination thereof. Computer system 900 may also include a communication interface 916, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 908, secondary memory 910, communication interface 916, or a combination thereof, function as a computer usable storage medium, otherwise referred to as a computer readable storage medium, to store and/or access computer software including computer instructions. For example, computer programs or other instructions may be loaded into the computer system 900 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 914 or hard disc unit 912 to the secondary memory 910 or through the communication infrastructure 904 to the main memory 908 of the computer system 900.

Communication interface 916 allows software, instructions and data to be transferred between the computer system 900 and external devices or external networks. Software, instructions, and/or data transferred by the communication interface 916 are typically in the form of signals that may be electronic, electromagnetic, optical or other signals capable of being sent and received by the communication interface 916. Signals may be sent and received using wire or cable, fiber optics, a phone line, a cellular phone link, a Radio Frequency ("RF") link, wireless link, or other communication channels.

Computer programs, when executed, enable the computer system 900, particularly the processor 906, to implement the methods of the invention according to computer software including instructions.

The computer system 900 described herein may perform any one of, or any combination of, the steps of any of the methods presented herein. It is also contemplated that the methods according to the invention may be performed automatically, or may be invoked by some form of manual intervention.

The computer system 900 of FIG. 15 is provided only for purposes of illustration, such that the invention is not limited to this specific embodiment. It is appreciated that a person skilled in the relevant art knows how to program and implement the invention using any computer system.

The computer system 900 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

Embodiments also may be implemented using cloud computing systems known in the art.

Figure 16:
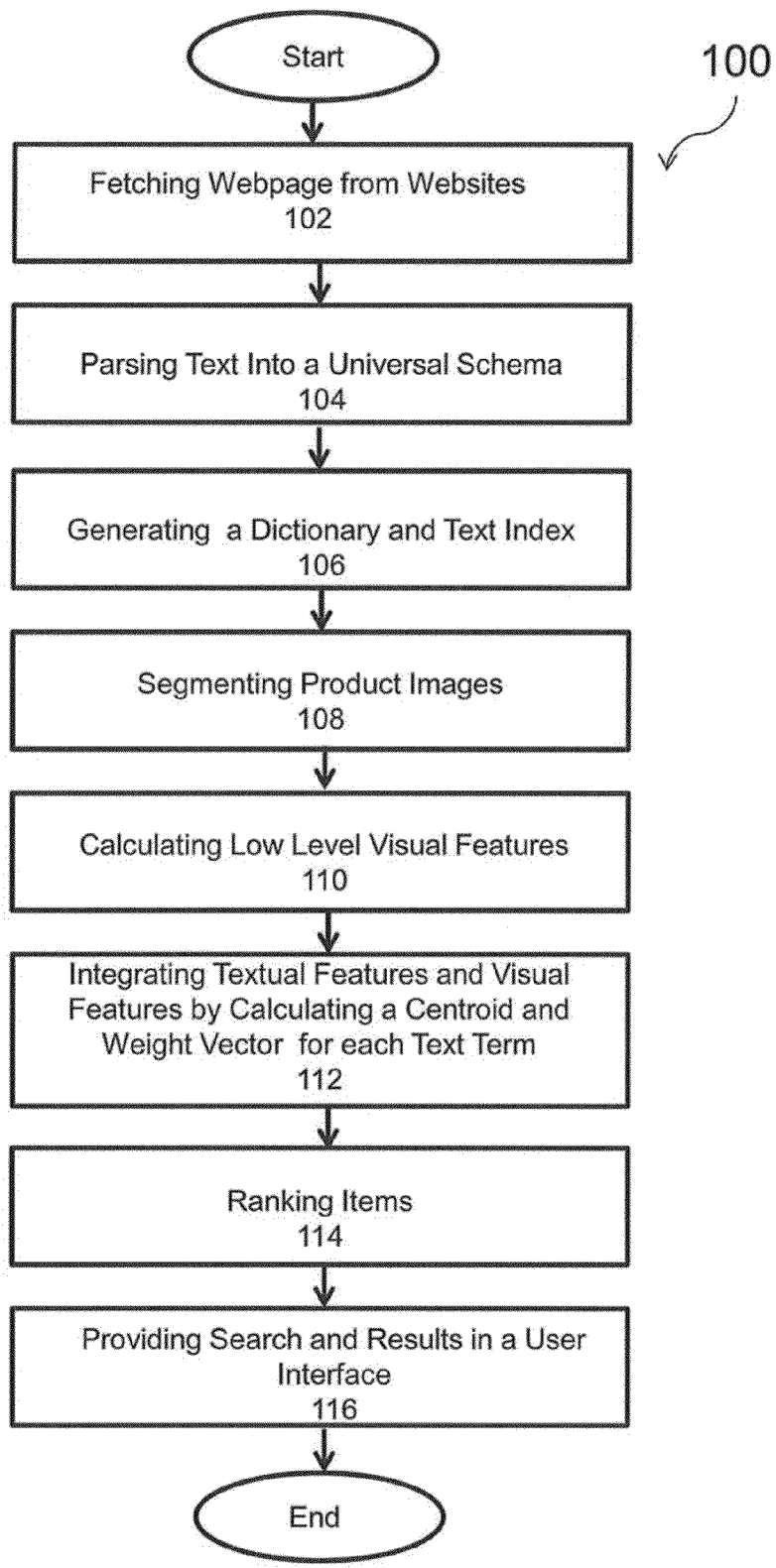
FIG. 16 illustrates an exemplary method embodiment of the present invention.

A method embodiment is illustrated in FIG. 16. Web pages are fetched from websites on a network 102. The text is parsed into a universal schema 104. A dictionary and text index is generated 106. Product images may be segmented to remove unnecessary portions 108. Low-level visual features are calculated using an image processor 110. Textual features and visual features are integrated by calculating a centroid and weight vector for each text term 112. Each weight vector may be optimized using an optimization step. Items are ranked using the weight vector 114. The search results are displayed in a search and user interface 116.

Overall, embodiments of the present invention may permit improved precision, primarily due to increased number of positive samples for each term.

Embodiments may include increased computation, but many such computations can be done off-line, which is manageable for most systems. The computational complexity of text-based indexing is $O(n \log n)$, where n denotes the total number of terms. Computation for visual feature extraction highly depends on the feature, and is linearly increasing with the number of images. K-S test could be calculated in linear time, and the computation for different features could be easily parallelized, if needed.

Computation for retrieving the initial set by text-based retrieval has slightly increased relative to certain conventional systems. It is known that the computation for text-based search in an inverted index is $O(\log n)$, where n denotes the size of the index.

Computation for querying with expanded queries is increased relative to certain conventional systems. To compute pair-wise similarity between the weighted query and every item, the computation would be $O(n)$, where n denotes the total number of items. However, computation could be improved by creating (in offline) an index, based on the observation that generally similar items are more likely to be similar in the weighted space. For each item, we store a ranked list of "similar items" based on cosine similarities between original feature vectors. In querying, the index is followed to compute the distances between the weighted query and top items in the index.

In addition, the most computationally expensive steps (feature extraction, K-S test, matching weighted query against every item) could be easily parallelized to improve the system performance.

Another general point is that certain embodiments of the present invention perform better for keywords with higher frequency. The weight vector is more reliable when it is based on more positive samples. Meanwhile, certain embodiments perform better if (1) the weight vector appears to be "clean"—a relatively small number of weight values are high, and the others are very low, and (2) high weight values are somewhat clustered, so that we can clearly observe some non-random visual meanings from the weight vectors.

The described embodiments above are to be considered in all respects only as illustrative and not restrictive, and the scope of the invention is not limited to the foregoing description. Those of skill in the art will recognize changes, substitutions and other modifications that will nonetheless come within the scope of the invention and range of the claims.

What is claimed is:

1. A system for image searching in a vertical content area to generate a ranked image search list, comprising:
   a memory;
   a display;
   a processor connected to the memory and the display; and
   a data input device for receiving an input of a text query into the memory;
   the processor processing the text query by:
      collecting a set of information based on the text query, the set of information including one or more images and one or more text terms;
      analyzing the one or more images of the set for one or more visual features;
      determining one or more text features of the one or more text terms of the set;
      obtaining keywords using the one or more visual features and the one or more text features;
      assigning to each keyword a weight vector, the weight vector representing a visual perception of the one or more visual features and the one or more text features;
      using the weight vector of each keyword to rank each visual feature of the one or more visual features and the one or more text features to obtain a ranked list of items, wherein a higher weight is given to a feature when the keyword is used as a text query; and
      displaying the ranked list of items on the display.

2. The system of claim 1, further comprising a database configured to store the set of information including one or more images and one or more text terms.

3. The system of claim 1 further comprising a crawler configured to fetch one or more web pages from the world wide web, wherein the crawler may be configured to fetch only certain types of web pages.

4. The system of claim 1, wherein the processor receives the text query as entered by a user through the data input device.

5. The system of claim 1, wherein the processor optimizes the weight vector to obtain an optimized weight vector.

6. The system of claim 1, wherein the processor produces a visual thesaurus using the weight vector.

7. The system of claim 1 further comprising an image processor for extracting from the one or more images the one or more visual features including a shape, a color, and a texture.

8. The system of claim 7, wherein the one or more visual features obtained using the image processor are normalized to permit comparison among features that take values from different domains.

9. The system of claim 1 further comprising a parser for identifying from the one or more text terms the one or more text features including a description associated with the one or more images.

10. The system of claim 1, wherein the processor further analyzes the one or more images by segmenting the one or more images to remove background information.

11. A computer for image searching, the computer method comprising the steps of:
   receiving by a processor a text query input using a data input device;
   collecting by the processor set of information including one or more web pages, wherein each web page includes an image and a text term;
   analyzing by an image processor the image to ascertain at least one visual feature including a shape, a color, or a texture of the image;
   assessing by a parser the text term to obtain at least one text feature;
   obtaining keywords using the at least one visual feature and the at least one text feature;
   calculating by the processor a weight vector for each keyword, the weight vector representing a visual perception of the at least one visual feature and the at least one text feature;
   ranking by the processor the at least one visual feature and the at least one text feature using the weight vector to obtain ranked items; and
   displaying on a user interface the ranked items.

12. The computer method of claim 11 further comprising the step of creating by the processor a visual thesaurus for the keywords.

13. The computer method of claim 12 further comprising the step of optimizing by the processor the weight vector by associating keyword synonyms identified in the visual thesaurus with other keyword synonyms.

14. The computer method of claim 11 further comprising the step of segmenting by the processor the image to remove background information from the image.

15. The computer method of claim 11 further comprising the step of normalizing by the processor the at least one visual f turcsfeature to permit comparison with other visual features having values from different domains.

16. The computer method of claim 11 further comprising the step of forming by the processor at least two feature distributions for each keyword.

17. The computer method of claim 16, further comprising the step of measuring by the processor differences between the at least two feature distributions using a Kolmogorov-Smirnov test.

18. The computer method of claim 11, wherein the weight vector is a query weight vector calculated by combining the weight vector for each keyword when text query includes more than one keyword.

19. The computer method of claim 11 further comprising the step of performing by the processor an evaluation of the ranked items compared to ranked items generated by a content-based image retrieval (CBIR) technique.

20. The computer method of claim 11 further comprising the step of deriving by the processor semantic meaning of the at least one visual feature using a technique chosen from the group consisting of: a neural network technique, a support vector machine technique, a Bayesian technique, or a bootstrapping technique.

* * * * *